(12) United States Patent
Pirnazar et al.

(10) Patent No.: US 12,739,291 B2
(45) Date of Patent: Sep. 15, 2026

(54) CONTENT AND DEVICE AGNOSTIC SYSTEM FOR PROVIDING SIMULATED BROWSING SESSIONS FEATURING MULTIPLE AI CONTROLLED AGENTS

(71) Applicant: Samesurf, Inc., Los Angeles, CA (US)

(72) Inventors: Kambiz David Pirnazar, Los Angeles, CA (US); Adam Flaherty, Milton Keynes (GB)

(73) Assignee: Samesurf, Inc., Los Angeles, CA (US)

( * ) Notice: Subject to any disclaimer, the term of this patent is extended or adjusted under 35 U.S.C. 154(b) by 0 days.

(21) Appl. No.: 19/574,162

(22) Filed: Mar. 20, 2026

(65) Prior Publication Data

US 2026/0222457 A1 Jul. 30, 2026

Related U.S. Application Data

(63) Continuation of application No. 18/790,471, filed on Jul. 31, 2024, which is a continuation of application No. 18/370,331, filed on Sep. 19, 2023, now Pat. No. 12,088,647, which is a continuation of application (Continued)

(51) Int. Cl.
*H04L 65/401* (2022.01)

(52) U.S. Cl.
CPC ................................ *H04L 65/4015* (2013.01)

(58) Field of Classification Search
CPC ............. H04L 65/4015; H04L 12/1822; H04L 12/1827; H04L 65/1089; H04L 65/403
See application file for complete search history.

(56) References Cited

U.S. PATENT DOCUMENTS 5,708,780 A 1/1998 Levergood et al.
5,944,791 A 8/1999 Scherpbier
6,070,185 A 5/2000 Anupam
(Continued)

FOREIGN PATENT DOCUMENTS

WO 00/48110 8/2000

OTHER PUBLICATIONS

"NCSA Mosaic, Project Profile," University of Illinois, National Center for Supercomputing Applications (available at: https://www.ncsa.illinois.edu/research/project-highlights/ncsamosaic/).
(Continued)

*Primary Examiner* — Jerry B Dennison
(74) *Attorney, Agent, or Firm* — Farjami & Farjami LLP

(57) ABSTRACT

A system for providing simulated browsing sessions by receiving data identifying one or more online actions from a first AI controlled agent of a plurality of AI controlled agents, selecting one or both of the cloud browser or the API for executing one or more online actions based on the one or more online actions, executing the one or more online actions to generate a result, communicating the result of executing the one or more online actions to each of the plurality of AI controlled agents, and accepting another data identifying a subsequent online action determined by the second AI controlled agent based on the result of the execution or a task previously defined by a human user wherein the first AI controlled agent and the second AI controlled agent participate in an independent and at least partially contemporaneous manner to advance the task.

30 Claims, 12 Drawing Sheets

Related U.S. Application Data

No. 18/225,982, filed on Jul. 25, 2023, now Pat. No. 12,101,361.

(60) Provisional application No. 63/448,057, filed on Feb. 24, 2023, provisional application No. 63/446,707, filed on Feb. 17, 2023.

(56) References Cited

U.S. PATENT DOCUMENTS

| | | | |
|---|---|---|---|
| 6,353,822 | B1 | 3/2002 | Lieberman |
| 8,527,591 | B2 | 9/2013 | Pirnazar |
| 8,849,914 | B2 | 9/2014 | Bove et al. |
| 9,171,087 | B2 | 10/2015 | Pirnazar |
| 9,185,145 | B2 | 11/2015 | Pirnazar |
| 9,483,448 | B2 | 11/2016 | Pirnazar |
| 9,489,353 | B2 | 11/2016 | Pirnazar |
| 9,756,096 | B1 | 9/2017 | Lilienthal |
| 10,079,796 | B2 | 9/2018 | Pirnazar |
| 10,129,346 | B1 | 11/2018 | Roy |
| 10,432,892 | B1 | 10/2019 | Tamayo |
| 10,951,554 | B1 | 3/2021 | Highman |
| 11,172,006 | B1 | 11/2021 | Ashkenazi |
| 11,349,889 | B1 | 5/2022 | Ashkenazi |
| 12,088,647 | B1 | 9/2024 | Pirnazar |
| 2002/0198941 | A1 | 12/2002 | Gavrilescu |
| 2005/0021626 | A1 | 1/2005 | Prajapat et al. |
| 2005/0033656 | A1 | 2/2005 | Wang et al. |
| 2009/0037517 | A1 | 2/2009 | Frei |
| 2009/0164581 | A1 | 6/2009 | Bove |
| 2010/0250756 | A1 | 9/2010 | Morris |
| 2010/0257451 | A1 | 10/2010 | Halevi |
| 2012/0016937 | A1 | 1/2012 | Merrifield |
| 2016/0072858 | A1 | 3/2016 | Heyne |
| 2016/0092037 | A1 | 3/2016 | Cesena |
| 2017/0024100 | A1 | 1/2017 | Pieper |
| 2017/0185368 | A1 | 6/2017 | Handrigan |
| 2018/0219849 | A1 | 8/2018 | Jones |
| 2018/0301048 | A1 | 10/2018 | Almassizadeh |
| 2020/0044907 | A1 | 2/2020 | Stephure |
| 2021/0075832 | A1 | 3/2021 | Bisztrai |
| 2021/0352471 | A1 | 11/2021 | Hallock |
| 2021/0397402 | A1 | 12/2021 | Ashkenazi |
| 2022/0247800 | A1 | 8/2022 | Matula |
| 2024/0037418 | A1 | 2/2024 | Durairaj |
| 2024/0039873 | A1* | 2/2024 | Durairaj .................. H04L 51/02 |
| 2024/0283868 | A1* | 8/2024 | Ferris .................... G06F 40/211 |

OTHER PUBLICATIONS

"Netscape Communications Corp.," Henry R. Norr, Aug. 28, 2017, Encyclopedia Britannica, Inc. (available at: https://www.britannica.com/topic/Netscape-Communications-Corp).
"50 Years of Email," cloudHQ, Apr. 6, 2021 (available at: https://www.prnewswire.com/news-releases/50-years-of-email-301262676.html).
"The History of Email: Major Milestones from 50 Years," Kasey Steinbrinck, Jan. 28, 2021, Email on Acid Ina Fried, (available at: https://www.emailonacid.com/blog/article/emailmarketing/history-of-email/).
"10 Instant Messaging Services that Used to Be Popular," Elise Moreau, May 3, 2021, Lifewire Tech for Humans (available at: https://www.lifewire.com/once-popular-old-instant-messagingservices-3486135).
"Timeline of Social Media," Wikipedia (available at: https://en.wikipedia.org/wiki/Timeline_of_social_media).
"Hyperlink," Wikipedia (available at: https://en.wikipedia.org/wiki/Hyperlink).
"Session Identification URI," W3C Working Draft WD-session-id-960221, w3 Org (available at: https://www.w3.org/TR/WDsession-id.html).
"Giving Web a Memory Cost Its Users Privacy," John Schartz, Sep. 4, 2001, New York Times (available at: https://www.nytimes.com/2001/09/04/business/giving-web-amemory-cost-its-users-privacy.html).
"GroupWeb: A WWW Browser as Real Time Groupware," Saul Greenberg and Mark Roseman, CHI '96 ACM Conference on Human Factors in Computing Systems, Apr. 13-18, 1996 (available at: https://dl.acm.org/doi/pdf/10.1145/257089.257317).
"Let's Browse: A Collaborative Web Browsing Agent," IUI '99: ACM Proceedings of the 4th International Conference on Intelligent User Interfaces, Dec. 1998 (available at: https://dl.acm.org/doi/10.1145/291080.291092).
"Letizia: An Agent that Assists Web Browsing," Henry Lieberman, International Joint Conference on Artificial Intelligence, 1995 (available at: https://web.media.mit.edu/~lieber/Lieberary/Letizia/Letizia-AAAI/Letizia.html).
"Google Docs," Wikipedia (available at: https://en.wikipedia.org/wiki/Google_Docs).
"Google Announces Google Docs & Spreadsheets," Oct. 11, 2006, Google Press Release, (available at: http://googlepress.blogspot.com/2006/10/google-announces-googledocs_11.html).
"The History of JavaScript: Everything You Need to Know," T.J. DeGroat, Aug. 19, 2019, Springboard (available at: https://www.springboard.com/blog/data-science/history-ofjavascript/).
"Adobe Flash," Wikipedia (available at: https://en.wikipedia.org/wiki/Adobe_Flash).
"What Does AJAX Even Stand For?," Jay Hoffman, Mar. 4, 2019, The History of The Web (available at: https://thehistoryoftheweb.com/what-does-ajax-even-stand-for/).
IPR2023-00339: Petition for Inter Partes Review of U.S. Pat. No. 9,185,145, filed on Dec. 16, 2022.
IPR2023-00341: Petition for Inter Partes Review of U.S. Pat. No. 9,483,448, filed on Dec. 16, 2022.
IPR2023-00342: Petition for Inter Partes Review of U.S. Pat. No. 8,527,591, filed on Dec. 16, 2022.
File History of U.S. Pat. No. 8,527,591, filed May 20, 2010.
File History of U.S. Pat. No. 9,171,087, filed May 20, 2010.
File History of U.S. Pat. No. 9,185,145, filed Jul. 26, 2013.
File History of U.S. Pat. No. 9,483,448, filed Aug. 19, 2015.
File History of U.S. Pat. No. 9,489,353, filed Sep. 10, 2015.
File History of U.S. Pat. No. 10,079,796, filed Feb. 5, 2016.
File History of IPR2023-00339, filed on Dec. 16, 2022.
File History of IPR2023-00341, filed on Dec. 16, 2022.
File History of IPR2023-00342, filed on Dec. 16, 2022.
File History of U.S. Appl. No. 19/416,335, filed Dec. 11, 2025.
File History of U.S. Appl. No. 19/444,017, filed Jan. 8, 2026.
File History of U.S. Appl. No. 18/790,471, filed Jul. 31, 2024.
File History of U.S. Appl. No. 19/574,170, filed Mar. 20, 2026.
File History of U.S. Appl. No. 19/574,174, filed Mar. 20, 2026.
File History of U.S. Appl. No. 19/574,180, filed Mar. 20, 2026.
File History of U.S. Appl. No. 18/649,914, filed Apr. 27, 2026.
File History of U.S. Appl. No. 19/660,000, filed Apr. 29, 2024.
File History of U.S. Appl. No. 19/661,352, filed Apr. 20, 2026.
File History of U.S. Pat. No. 12,101,361.
File History of U.S. Pat. No. 12,088,647.

* cited by examiner

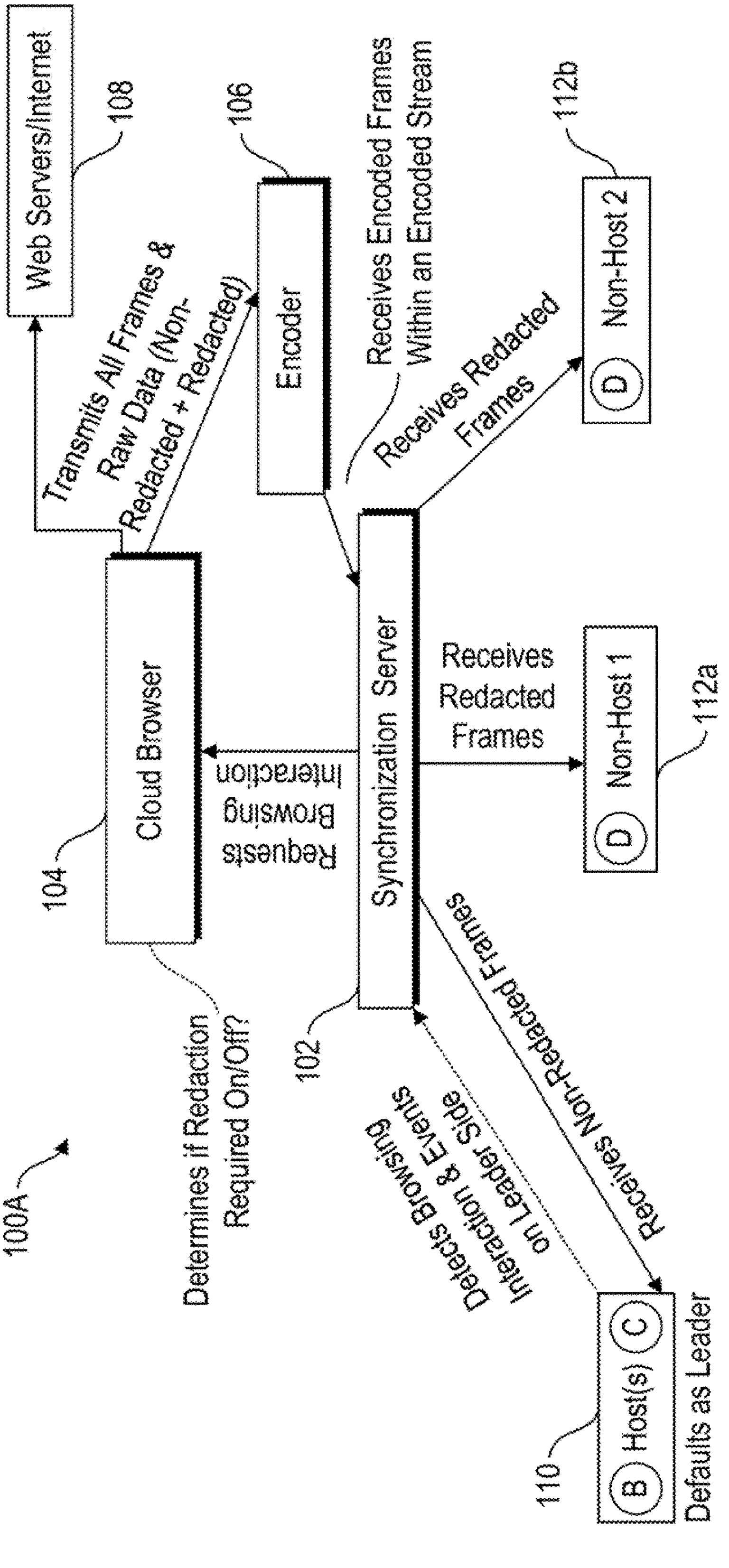

(A) Synchronization Server sends Embedded Frames to all of the participants.

(B) The Host is the person who receives the non-redacted version (if applicable) of the Encoded Stream.

(C) There can be multiple Hosts.

(D) Any Host can pass control to a Non-Host to lead the cobrowse as Leader BUT the Non-Host will view the redacted version of the frames.

(E) Custom Encoder may send two Encoded Streams if Redaction is Required

FIG. 1A

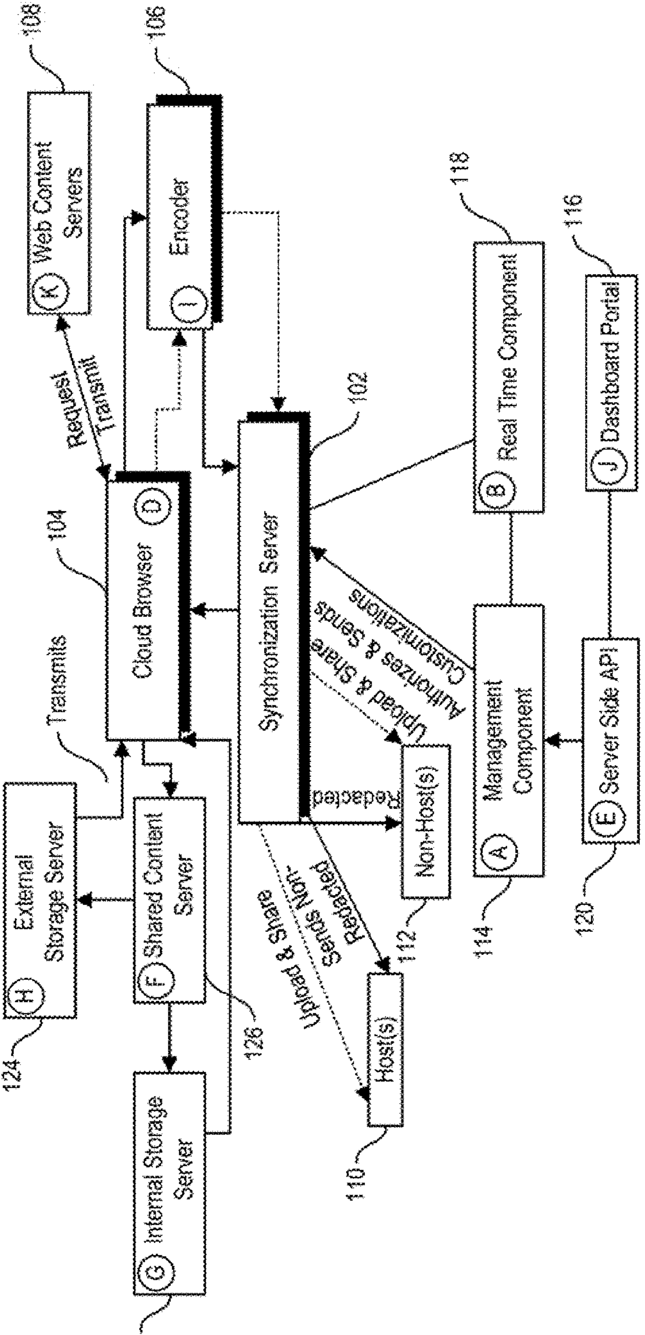

(A) Management (MGMT) - handles authorizations and customizations (B) Real Time - establishes connection to Room Server (C) Synchronization (or Room) Server - establishes actual session and distributes Encoded Video Stream (D) Custom Cloud Browser - executes the web browsing interactions (E) Server Side API - preloads customizations such as existing states, pre-existing form inputs & settings (F) Shared Content Server - guardian that pulls authenticated files from the Internal or External Storage Server (G) Internal Storage Server - serves as internal file repository for Shared Content Server to support PDF rendering in cobrowse and Upload & Share (H) External Storage Server - serves as external repository of files for Shared Content Server to support Upload & Share (I) Custom Encoder - receives raw frame data from Custom Cloud Browser in order to curate frame changes and then distributes an Encoded Stream for distribution by the Synchronization Server (J) Dashboard Portal - serves as UI layer for MGMT (K) Web Content Servers - holds web content that Custom Cloud Browser accesses to execute web browsing interactions in real time

FIG. 1B

240
Server
Processor 244
Cloud Browser 204
Encoder 206
248
Memory 246
Software Code 242
230
228
232
234
238
234
236
228
Session Initiating Device
234
228
Invitee Device
210
212

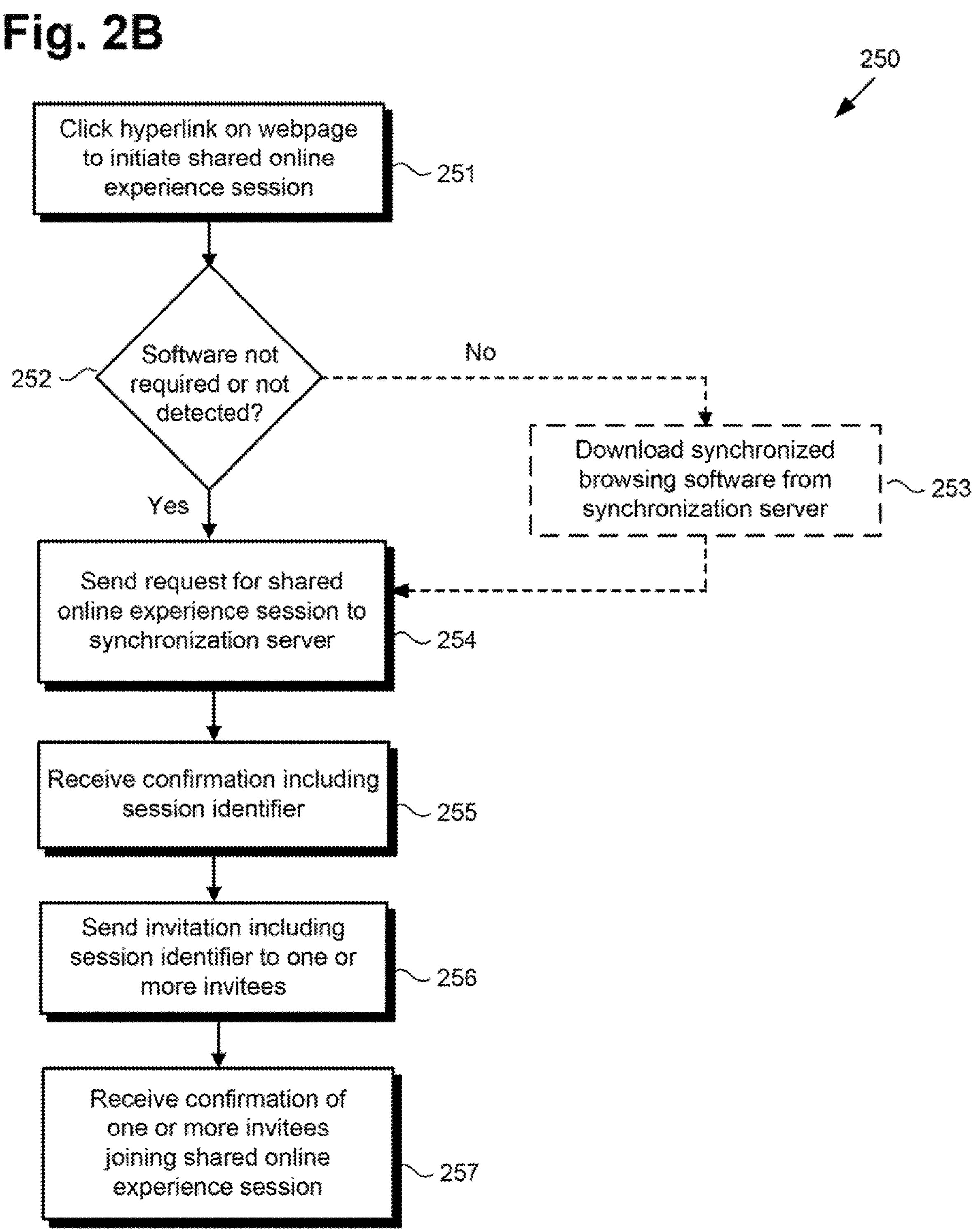
Fig. 2B
250
Click hyperlink on webpage to initiate shared online experience session
251
Software not required or not detected?
252
No
Download synchronized browsing software from synchronization server
253
Yes
Send request for shared online experience session to synchronization server
254
Receive confirmation including session identifier
255
Send invitation including session identifier to one or more invitees
256
Receive confirmation of one or more invitees joining shared online experience session
257

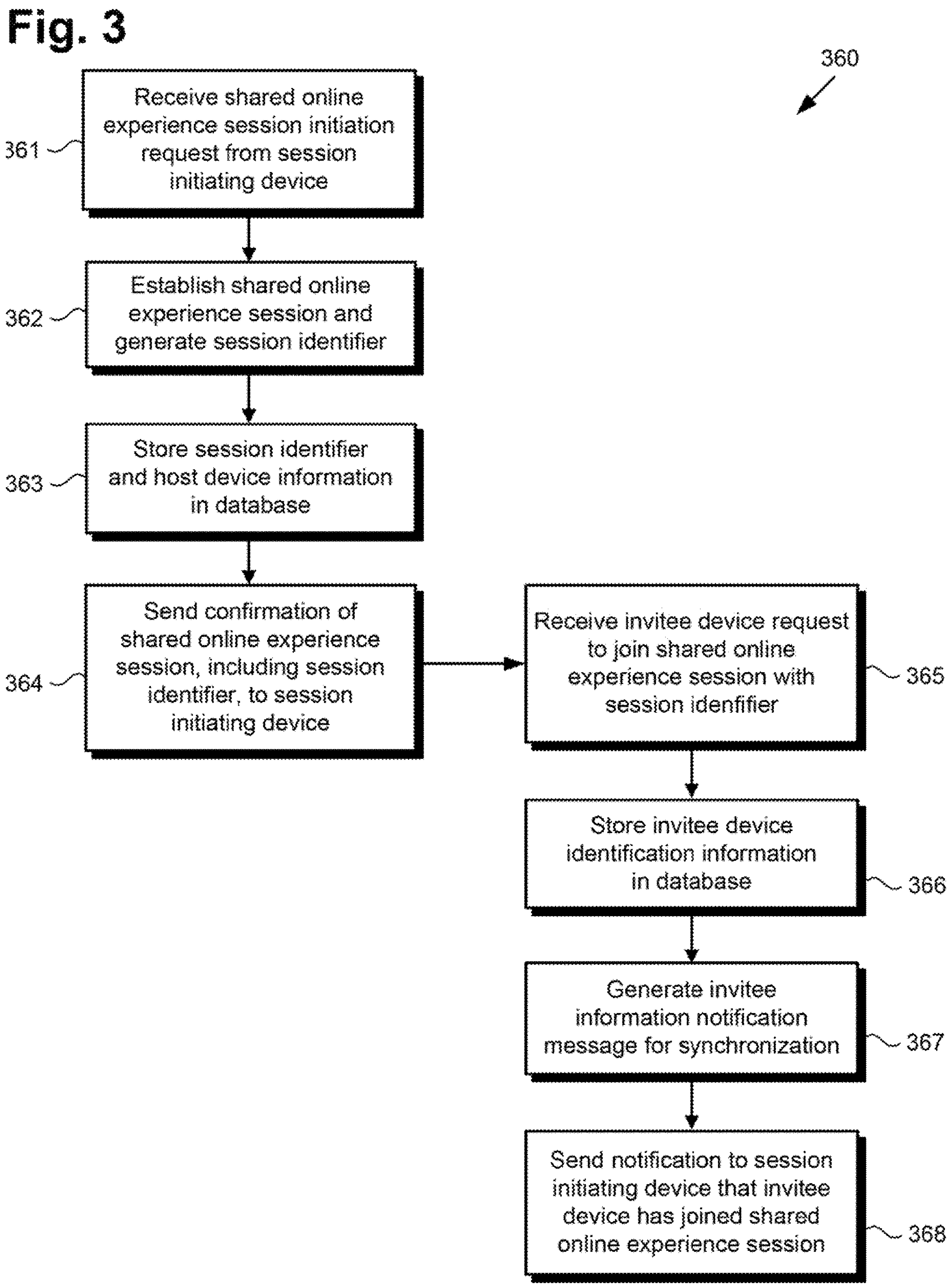
Fig. 3
360
Receive shared online experience session initiation request from session initiating device
361
Establish shared online experience session and generate session identifier
362
Store session identifier and host device information in database
363
Send confirmation of shared online experience session, including session identifier, to session initiating device
364
Receive invitee device request to join shared online experience session with session idenfifier
365
Store invitee device identification information in database
366
Generate invitee information notification message for synchronization
367
Send notification to session initiating device that invitee device has joined shared online experience session
368

640
Server
Processor 644
Cloud Browser 604
Encoder 606
692b
692a
695
693
648
Memory 646
Software Code 642
691a
693a
694
695a
693b
691b
695b
Session Initiating Device
Invitee Device
610
612

710

728 Transceiver

720 Hardware Processor

Display

726

Device Memory 722

Software Code 724a

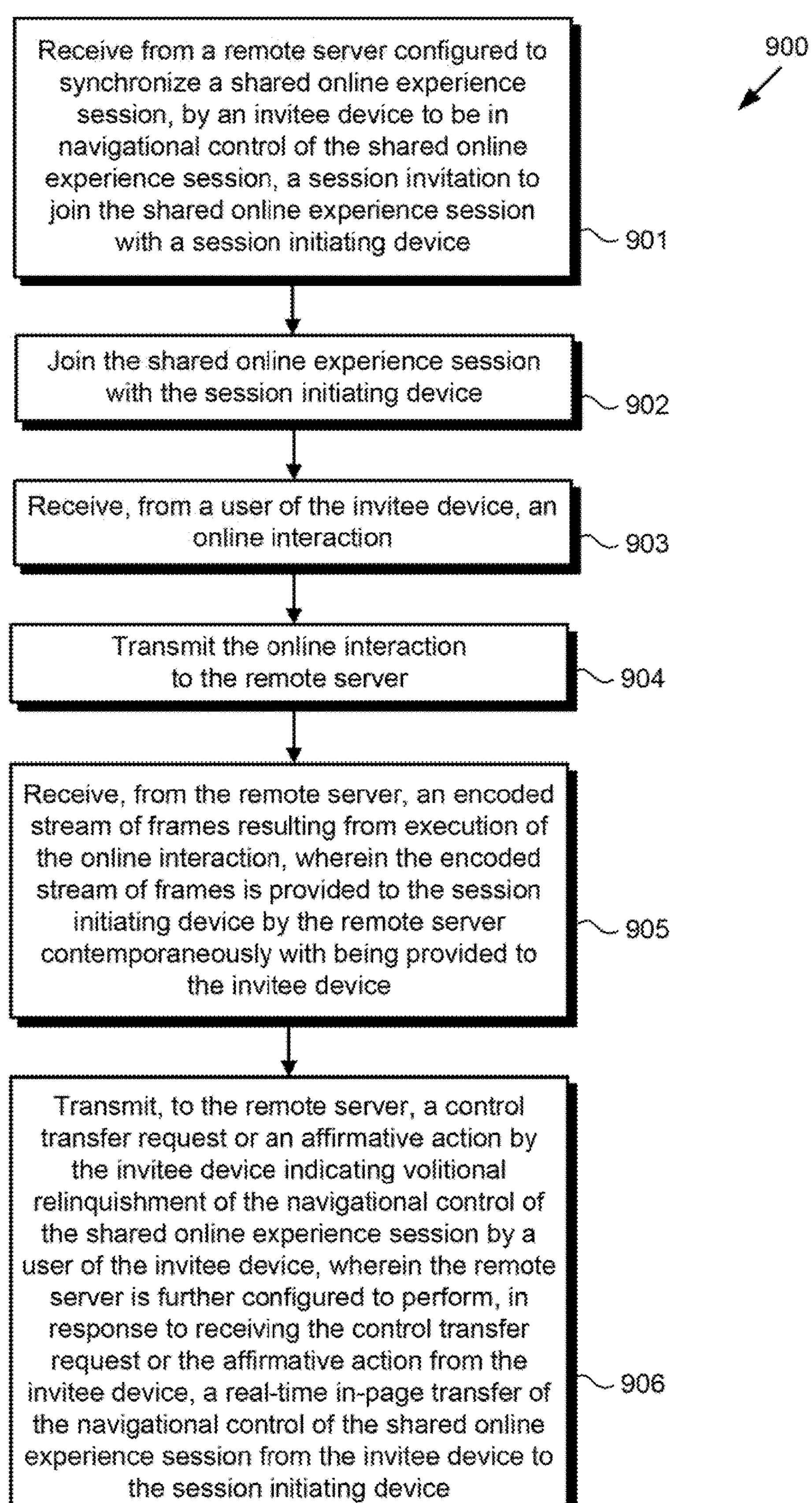
Fig. 9
900
Receive from a remote server configured to synchronize a shared online experience session, by an invitee device to be in navigational control of the shared online experience session, a session invitation to join the shared online experience session with a session initiating device
901
Join the shared online experience session with the session initiating device
902
Receive, from a user of the invitee device, an online interaction
903
Transmit the online interaction to the remote server
904
Receive, from the remote server, an encoded stream of frames resulting from execution of the online interaction, wherein the encoded stream of frames is provided to the session initiating device by the remote server contemporaneously with being provided to the invitee device
905
Transmit, to the remote server, a control transfer request or an affirmative action by the invitee device indicating volitional relinquishment of the navigational control of the shared online experience session by a user of the invitee device, wherein the remote server is further configured to perform, in response to receiving the control transfer request or the affirmative action from the invitee device, a real-time in-page transfer of the navigational control of the shared online experience session from the invitee device to the session initiating device
906

CONTENT AND DEVICE AGNOSTIC SYSTEM FOR PROVIDING SIMULATED BROWSING SESSIONS FEATURING MULTIPLE AI CONTROLLED AGENTS

RELATED APPLICATIONS

The present application is a Continuation of U.S. application Ser. No. 18/790,471, filed Jul. 31, 2024, which is a Continuation of U.S. application Ser. No. 18/370,331, filed Sep. 19, 2023, which is a Continuation of U.S. application Ser. No. 18/225,982, filed Jul. 25, 2023, which claims the benefit of and priority to Provisional Patent Application Ser. No. 63/446,707, filed Feb. 17, 2023, and titled "Multi-User Online Experience Sharing with In-Page Control Passing," and Provisional Patent Application Ser. No. 63/448,057, filed Feb. 24, 2023, and titled "Multi-User Online Experience Sharing with In-Page Control Passing," which are all hereby incorporated fully by reference into the present application.

BACKGROUND

Conventional screen broadcasting technologies include "screen sharing" and "remote desktop." Screen sharing is a legacy solution that involves the continuous capture and broadcast of the presenter's screen (or certain windows therein) onto a finite number of receiving screens to provide view only access to other session participants. Within this realm, remote desktop is a more invasive variant on conventional screen sharing that gives one remote user (e.g. the support agent) the ability to remotely control another user's entire device or computer from a remote location (e.g. the remote client). Remote desktop typically requires installs, is highly ineffective on mobile devices and carries even higher latency and resource utilization parameters than standard screen sharing.

Although first generation shared browsing technologies that are built around the detection of the online interactions of one or more leading participants for independent replication by one or more following participants currently exist, these event-based offerings known as "cobrowsing," "synchronized browsing," and/or "collaborative browsing" are typically considered highly invasive from an information technology (IT) implementation and security standpoint since they require the placement or injection of third party enabling code, such as JavaScript® tags, on each and every page that is eligible for shared browsing. Furthermore, these existing solutions are limited to supporting collaborative browsing within online content that is owned and operated by participating content publishers who are in a position to place, allow or inject required code within their web pages (and/or other forms of online content) in order to make them eligible for synchronized browsing. Accordingly, there remains a need in the art for a high performance, low-latency, and highly secure content and device agnostic experience sharing solution that is non-invasive and that can enable multiple users to concurrently interact with and/or pass navigational control within any form of online content on an "out of the box" basis in a manner that does not require installs, code placements, engineering, browser notifications, port changes and/or IT modifications or involvement of any kind.

BRIEF DESCRIPTION OF THE DRAWINGS

FIG. 1A shows a conceptual diagram of a system for providing a content and device agnostic shared online experience session, as well as a use environment in which the system is implemented, according to one implementation;

FIG. 1B shows a more detailed diagram of the system for providing the shared online experience session shown in FIG. 1A, according to one implementation;

FIG. 2B shows a flowchart of a method utilized by a session initiating device for the initiation of a shared online experience session, according to one implementation;

FIG. 3 shows a flowchart of a method utilized by a server for the initiation of a shared online experience session, according to one implementation;

FIG. 9 shows a flowchart presenting an exemplary method for use by an invitee device for engaging in a shared online experience session with a session initiating device, according to one implementation.

DETAILED DESCRIPTION

Figure 2A:
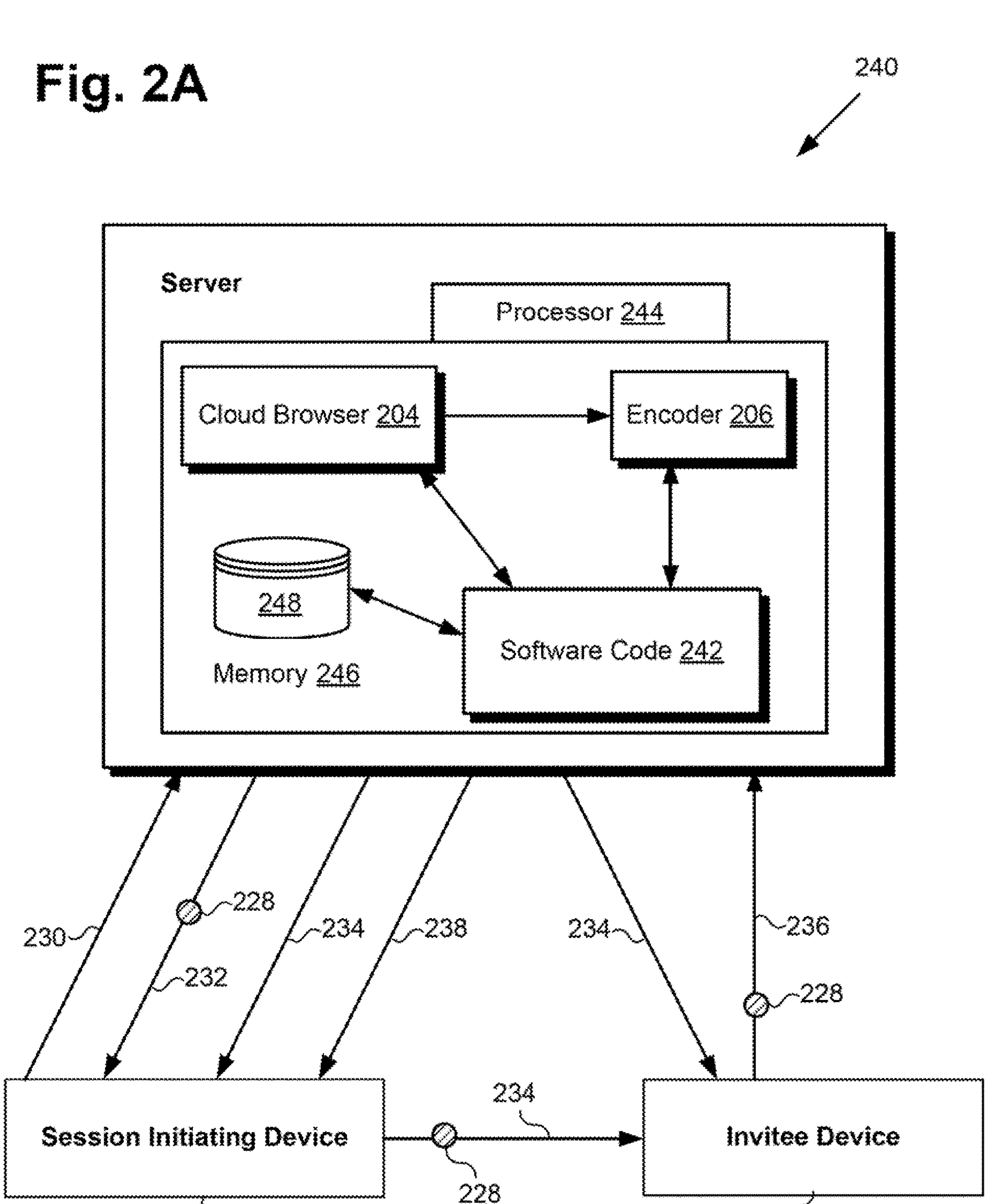
FIG. 2A shows a consolidated server implementation of a system for providing a shared online experience session in communication with a session initiating device and an invitee device during a login and authentication process, according to one implementation.

The following description contains specific information pertaining to implementations in the present disclosure. One skilled in the art will recognize that the present disclosure may be implemented in a manner that is different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale and are not intended to correspond to actual relative dimensions.

The present application discloses a content and device agnostic online experience sharing solution that optionally features in-page control passing which enables multiple remote users to simultaneously interact with and/or pass navigational control within any form of online content built on any current or future online technology. In this regard and within this summary, it is essential to note that the terms "online" and/or "web" refer to any form of internet-based content including, but not limited to, websites, desktop apps, mobile apps, virtual worlds (or the "metaverse"), and/or any other form of online content which exists on any device, medium or browser as of the filing date or in the future. The present solution securely recreates the experience of having multiple remote users share and interact with the same online experiences in real time while complementing these experiences with exemplary abilities to:

(1) instantly upload and share documents and videos (including the audio components) for shared real time interaction and/or viewing within low-latency environments;
(2) talk or video chat via online communication methods such as Voice over Internet Protocol (VOIP), cellular voice and/or any other video and audio-based mediums;
(3) safeguard screen elements and/or prevent interaction with specific page components during shared sessions via screen redaction which designates certain types of input fields and/or other screen elements such as credit card entries, passwords, CSS elements or pre-existing site elements as "not shareable" during shared sessions which would lead these elements to be redacted or obfuscated from the view of or eligible for interaction by unauthorized participants;
(4) share offline content via integrated screen sharing;
(5) share each participants'cursor positioning on each respective screen in real time on a continuous basis so that they are all able to point out screen elements to one another;
(6) annotate or screen draw in a collaborative fashion over screen elements within the same online sharing experience;
(7) garner in-depth analytics;
(8) experience the same online content across multiple tabs as these tabs would appear within standard modern browsers; and
(9) record and share sessions—all from a standard browser, mobile application or other online-enabled platform without requiring installs, engineering, information technology (IT) modifications, code placements, network changes or exposure of the leader's desktop or screen.

As a preliminary matter, it is noted that the present online experience sharing solution and its underlying framework are distinct from conventional screen broadcasting technologies such as "screen sharing" and "remote desktop." For that matter, the online experience sharing solution referenced herein and its underlying framework are also distinct from the first generation shared browsing offerings referenced above which are commonly referred to as "co-browsing" or "synchronized browsing" solutions that are based on the detection of the leaders'online interactions for independent and continuous replication by the follower (or guest) devices in a manner that supports shared browsing of online content.

Within traditional "co-browsing" constructs (hereafter collectively referred to as "Online Browsing Interaction Replication Technologies"), the placement or injection of enabling code such as JavaScript® tags is typically required to support co-browsing in the following manner:

(1) once the leader(s) and follower(s) have joined the same session, the synchronization server (defined below) continuously detects online browsing interactions that occur on the leader device(s) (such as scrolling events within a page or movements to new Uniform Resource Locators (URLs)); and
(2) upon detecting the leaders'online browsing interactions, the synchronization server transmits instructions to the follower (or guest) devices to independently replicate these individual interactions by having each follower device directly access the web and/or online server(s) that are hosting the content that is required to independently replicate these online browsing interactions in real time (e.g. the google.com web servers).

The net result of these series of (1) interaction detection events; (2) replication instruction transmissions; and (3) the resulting replication events themselves together constitute well-recognized processes commonly known as "co-browsing," "synchronized browsing," and/or "online browsing interaction replication technology." As referenced above, these solutions commonly require the placement or injection of code on web pages (and/or online content) that are to be eligible for synchronized browsing. For security purposes, the synchronization server within these systems can also safeguard sensitive data on the host device via designations such as code placements, cookies and/or element tagging within cobrowse eligible pages that are owned and operated by the website, mobile app or content publisher who would be participating in the setup and overall execution of the underlying synchronized browsing system. Within this security-focused component, the content publisher is able to designate certain online browsing interactions on the leader side as "non-shareable" so that sensitive data entries or other content elements that are detected by the synchronization server are expressly not transmitted for replication and subsequent viewing or interaction by the guest device(s).

In terms of screen broadcasting technologies and as noted above, screen sharing is a legacy solution that involves the continuous capture and broadcast of the entirety of or certain windows within a presenter's screen into a finite number of receiving displays to provide view only access to the contents of the presenter's screen or individual windows. Conversely, remote desktop is an even more invasive variant on conventional screen sharing that carries higher latency and resource utilization parameters than screen sharing. Remote desktop also typically requires installs and/or notifications while actually giving one remote user (e.g. the support agent) the ability to control another user's entire device or computer (e.g. the online client) from a remote location.

By contrast, an implementation of the present content and device agnostic online experience sharing solution is directed to vastly simplifying and further securing the real time online experience sharing process while making the distance between remote users as unnoticeable as possible. The present disclosure accomplishes these results by enabling seamless real-time sharing of virtually all forms of online content or experiences without requiring installs, engineering, code placements, browser notifications, port changes or IT modifications for all participants from any device or platform in a manner that fundamentally transforms interactions based on real-time visual engagement and collaboration for businesses, consumers and other users. Exemplary business-related use cases for the present install and code-free online experience sharing solution include the unique ability for:

(1) sales and support representatives to instantly guide online prospects and customers with the option to share or pass navigational control within the same page, mobile app, desktop application or other form of online content via a single click at any point within the user journey without requiring the participants to re-authenticate, establish new web sessions, re-enter preexisting content within input fields or endure high latency and resource utilization levels that characterize alternative real time collaboration options like remote desktop;
(2) multiple collaborators to work together in real time through any form of content via any online platform without installing software, conducting engineering tasks or limiting the shared online experience to web content, apps or sites that are owned and operated by one or more participating publishers and/or are pre-coded to support the shared online journey;

(3) students and teachers to collaborate remotely without resorting to sharing their desktops or mobile screens;

(4) wealth managers to review financial performance and new product or service offerings in a simple to access, instant and ultra-secure environment that prevents exposure of sensitive information while complying with strict regulatory standards such as General Data Protection Regulation (GDPR) and Payment Card Industry Data Security Standard (PCI-DSS);

(5) trainers and customer success teams to assist and onboard exemplary users such as subscribers and employees through publisher controlled and third party online-based applications via shared sessions that live directly within their websites, apps or other forms of online content;

(6) loan officers to assist clients at any point within the user experience journey from product selection and mortgage completion to closing transactions online;

(7) doctors and patients to securely interact with one another and the same online content such as x-rays or treatment options from any remote location in a manner that complies with regulatory regimes such as the Heath Insurance Portability and Accountability Act of 1996 (HIPAA);

(8) eNotaries to interact with multiple stakeholders within remote notary experiences that comply with both state laws and regulatory standards such as General Data Protection Regulation (GDPR); and (9) multiple remote designers and their clients to collaborate in real time by being empowered to interact with the same design elements within the same design software.

Exemplary consumer-related use cases for the present real time experience sharing solution include the unique ability for multiple users to jointly view and/or interact with the same website content, video, song, rich media content, game, virtual world, multiverse experience or other form of online content that may exist within any online platform. More importantly, these use cases would not have the shared journey limited to online content where the participating publisher has control over the content in which their participation would be required to undertake engineering and/or code placement tasks to make each site or other content format eligible for purposes of supporting traditional co-browsing constructs such as the ones referenced above.

Accordingly, the present online experience sharing solution substantially advances the state-of-the-art in at least the following ways:

(1) It affords the ability to support multi-user, real-time online experience sharing through virtually the entire (or subsets of the) web and/or to collaboratively browse sites or other forms of online content that are not owned, controlled and/or operated by one or more participating sites, apps or content publishers;

(2) It affords the ability to support multi-user online experience sharing that is eligible to navigate throughout the entire (or designated subsets of the) web while enabling clients to create (a) a whitelist of eligible sites such as a client's own sites and business required third party sites or content such as DocuSign® forms and/or (b) a blacklist of non-eligible sites for co-browsing purposes such as those which feature competitive subject matter to one or more designated businesses and/or objectionable content such as pornography or social media content;

(3) It affords the ability to support virtually all current and future online technologies and the associated individual online browsing interactions that occur and/or are triggered within these experiences; as a significant challenge to existing shared browsing solutions, it's important to note that many current online technologies are architected in a manner that makes identification of the underlying online browsing interactions that occur within them non-identifiable via Online Browsing Interaction Replication Technology since many (if not all) of these underlying interactions are not exposed in the Document Object Model (DOM) of the website or other content format;

(4) It affords the ability to support fully synchronized experience sharing of the audio, video and interactive components of online video content and other forms of rich media such as games and multiverse experiences on an "out of the box" basis for every form of content without requiring engineering, quality assurance cycles, code placements and/or other measures for purposes of achieving play, pause & skip synchronization. Audio and video synchronization (a.k.a. synchronized playback) may be achieved by having the cloud browser also capture, encode and transmit the audio components of the media that is being displayed in synchronicity with the frames that are being sent to the encoder for the creation of the encoded stream of frames that are being continuously delivered to the synchronization server described below;

(5) It affords the ability to support real-time online experience sharing for online elements that reside entirely within JavaScript; for example, a pre-programmed auto-navigational scrolling movement within a webpage would typically not be accessible within the Document Object Model (DOM) of a webpage and would thus not be identifiable via Online Browsing Interaction Replication Technology;

(6) It affords the ability to support synchronized browsing of the following exemplary online technologies which are not supported by Online Browsing Interaction Replication Technology:

a. Cascading Style Sheet (CSS) transitions and animations-Elements that were originally programmed via JavaScript® on most websites or other content formats in the past are now performed via accelerated CSS Transitions; it's essential to consider that elements such as entire site navigational menus are currently being programmed via CSS transitions and animations (as these libraries are very widely utilized and are not supported by Online Browsing Interaction Replication Technology);

b. Scalable Vector Graphics (SVG) animations;

c. Canvas elements;

d. Web Graphics Library (WebGL) elements; and e. Elements that appear within iFrames since virtually all "framed content" is currently "sandboxed" which prevents access for replication purposes via traditional co-browsing technology; within this realm, it's essential to note that framing content is quite prevalent and presents a significant challenge to solutions based on Online Browsing Interaction Replication Technology;

(7) It affords the ability for clients and end users to entirely sidestep the requirements for engineering, code placements or injections, installs, browser notifications, port changes and/or IT modifications that come with virtually all alternative real time collaboration offerings;

(8) It affords the opportunity for clients and publishers to forego ongoing testing and quality assurance (QA) cycles when their websites or other online offerings change over time, since one implementation of the present disclosure "just works on an out of the box basis" without requiring continuous testing, engineering, code placements or IT involvement;

(9) It affords the ability to support any and all modern online technologies like WebGL, React and other yet disclosed or discovered technologies as long as these online technologies are supported by the Cloud Browser depicted in FIGS. 1A, 2A, 2B and 6;

(10) It affords the ability to support element redaction and input field blocking for third party content sites that are not owned and operated by the participating content publisher who would have the ability to redact sensitive elements or input entries via measures such as element tagging using Online Browsing Interaction Replication Technology; and

(11) It gives clients an option to deploy a content and device agnostic online experience sharing technology that does not force their IT, security, legal and deployment departments to compromise and/or downgrade their security infrastructure by requiring them to include or inject third party code on each and every page of their websites or other online offerings; it's important to note that the inclusion of third party code on subject websites or other online offerings is widely considered by security professionals in the IT industry as potentially constituting a broad vector of attack for hackers.

The following issued United States patents describe foundational "synchronized browsing" technology pertinent to the present application, and each is incorporated fully by reference into the present application:

U.S. Pat. No. 8,527,591, issued on Sep. 3, 2013, and titled "Method and Apparatus for the Implementations of a Real-Time Shareable Browsing Experience on a Guest Device."

U.S. Pat. No. 9,171,087, issued on Oct. 27, 2015, and titled "Method and Apparatus for the Implementations of a Real-Time Shareable Browsing Experience on a Host Device."

U.S. Pat. No. 9,185,145, issued on Nov. 10, 2015, and titled "Method and Apparatus for the Implementations of a Real-Time Shareable Browsing Experience on a Guest Device."

U.S. Pat. No. 9,483,448, issued on Nov. 1, 2016, and titled "Method and Apparatus for the Implementations of a Real-Time Shareable Browsing Experience on a Host Device."

U.S. Pat. No. 9,489,353, issued on Nov. 8, 2016, and titled "System and Method for Shareable Browsing Experience."

Turning to the figures, FIG. 1A shows a conceptual diagram of a system for providing a shared online experience session, as well as environment 100A in which the system is implemented, according to one implementation. Components of the present system for providing the shared online experience session include synchronization server 102, cloud browser 104, and encoder 106. Also shown in FIG. 1A are one or more Host browsing participant(s) 110 and Non-Host browsing participants 112*a* and 112*b* in communication with synchronization server 102, and web servers/Internet resources 108 that are accessible to cloud browser 104.

Descriptions and definitions of some of the features of the system shown in FIG. 1A are provided below:

The host is the entity that receives the non-redacted version (if redaction is required) of the encoded stream of frames from synchronization server 102; it is noted that there can be multiple hosts in a shared online experience session.

The non-host is the entity that receives the redacted version of the encoded stream of frames from synchronization server 102; it is further noted that there can be multiple non-hosts in a shared online experience session.

As an alternative to implementations in which a shared online experience session can include one or more hosts and one or more non-hosts, in some implementations a shared online experience session may include only hosts, i.e., multiple hosts and no non-host or non-hosts. As another alternative, in some implementations a shared online experience session may include only non-hosts, i.e., multiple non-hosts and no host or hosts.

It is further noted that both a host and a non-host can take the form of a human user and/or "bot or artificial intelligence (AI) enabled user" which can simulate the role of a human user either via scripting, customized programming, integration with an artificial intelligence component such as IBM Watson®, ChatGPT® or Google® Bard® and/or through any other simulated medium that exists as of the date of this summary or in the future.

Element redaction is the ability to redact, obfuscate, render inactive and/or omit certain content elements such as the inputting of text elements within input fields, page elements such as CSS buttons or links and other normally visible content components within the shared session.

If redaction is turned off or is otherwise inactive within the active implementation, then only the non-redacted version is sent to all participants (i.e., the host(s) and non-host(s)).

In another implementation and in order to increase transmission efficiencies, all participants may always receive only the redacted version of the encoded stream (in a single stream transmitted by synchronization server 102) and if redaction is required for certain element(s), Host(s) will thereafter receive the non-redacted component (e.g. a continuous stream of a credit card number being entered within an otherwise blank page inside the same page coordinates where the input box lives). In this type of exemplary implementation, the credit card inputs may overlay on top of the redacted version of the encoded stream so that only one encoded stream transmission is sent and only individual non-redacted content components such as the ability to enter actual credit card numbers are eligible for interaction and viewing by the host(s) should redaction be active.

The "leader" is the entity that directs the progression or navigation of online content and the individual online interactions that flow therefrom throughout the online experience sharing session; these online interactions are detected by synchronization server 102 and are then executed by cloud browser 104. It is noted that there can be multiple leaders in a session and when there are multiple leaders, the last online interaction of each of the leaders is replicated in real time if they occur at exactly or substantially the same time. The host(s) can default as the initial leader(s) but in other implementations, non-hosts can serve as the initial leader(s) as well.

The "follower" (or guest device) is the entity that follows the progression of online pages, individual online interactions and other content formats that are being activated on the leader side; these are detected by synchronization server 102 and are then executed by cloud browser 104; there can be multiple followers in which case the last of the leaders' interactions are shown if multiple online interactions occur at exactly or substantially the same time.

Non-hosts 112*a* or 112*b* can become the leader via (1) in-page navigational control passing from a current leader or session initiating user; (2) the subject users' initial designation as leader upon session initiation; or (3) by way of others leaving the session where other hosts and/or non-host 112*a* or 112*b* may inherit control. In the last of these cases, non-host 112*a* or 112*b*, in the role of leader, may still see the redacted version of the stream. However and in other implementations, it may be that non-host 112*a* or 112*b* becomes the leader and receives the non-redacted version of the stream.

In-page navigational control passing grants users the ability to permanently or temporarily convert a follower into a leader who is then able to interact within and among the same webpages (or other forms of online content) so that synchronization server 102 thereafter detects and via cloud browser 104 executes that new leader's online interactions. This includes, but is certainly not limited to, movements to new URLs which would constitute an exemplary online interaction (with the possibility of having one or multiple leaders). In-page control passing can be activated by having one leader or session initiating device manually and/or temporarily grant in-page control to one or more followers based on the independent decision of the session initiating device or leader and/or in response to one or more requests for attaining or sharing navigational control by a follower.

FIG. 1B shows a more detailed diagram of the system for providing the shared online experience session shown in FIG. 1A, according to one implementation. In addition to the features shown and described by reference to FIG. 1A, FIG. 1B shows management component 114, dashboard portal 116, real-time component 118, internal 122 and external 124 storage servers, and shared content server 126. That is to say, there are multiple components to the system that supports various implementations of the present disclosure:

1) Management component 114—also abbreviated as "MGMT"—handles all logins, tokens, authorizations, customizations, analytics, user experience (UX) branding, feature inclusions or exclusions (e.g. whether video chat is turned on or whether in-page control passing is activated), URL white and black listing (which sets forth root web domains that are expressly accessible within the cobrowse navigational route and those that are explicitly excluded for co-browsing purposes from the shared online experience) and other components.
2) Dashboard portal 116 interacts with and serves as the user interface (UI) element for the MGMT components.
3) Real-Time component 118 communicates with MGMT component 114 to:
   (a) ensure that the presented tokens are correct;
   (b) establish the connection to synchronization server 102 and deliver the initial webpage to cloud browser 104; and
   (c) work with cloud browser 104 to establish a connection to synchronization server 102 (which serves as a high performance, bi-directional connection).
4) The synchronization server 102 (a.k.a. room server) component:
   (a) verifies with MGMT 114 that the inbound connection is verified and authenticated so that the user can't spoof onto the connection;
   (b) sets up the room based upon the data that it has access to within MGMT component 114; and
   (c) distributes encoded stream(s) that are developed by encoder 106.
   (d) It is hereby noted that MGMT component 114 does the room assignment and join verification process (via synchronization server 102).
5) External 124 and internal 122 storage server components:
   (a) store files such as upload and share for documents, videos, images and other uploaded files; for example—the system is able to split an individual uploaded 10-page Portable Document Format (PDF) into 10 separate co-browse eligible web pages and all 10 pages are stored in the storage server for execution within cloud browser 104; as another example, the upload & share function is able to convert a user uploaded video into a cobrowse-ready format that is hosted on a system-hosted or external URL such that the playback of that particular video is perfectly synchronized in terms of play, pause and skip for all participants who are sharing the same session;
   (b) create temporary URLs that will support shared browsing for that document, video or other uploaded file type for that browsing session only; and
   (c) store the data privately and if the user wants to share a previously uploaded document, then the upload and share feature interacts with shared content server 126 to retrieve the subject files.
   (d) It's important to note that internal storage server component 122 is a repository of files that are separated in such a manner that shared content server 126 can either go to this internal repository to retrieve the files, or anywhere else such as AWS®, S3, Dropbox®, private servers, local discs, or any other repository (i.e. external storage server 124) or component to support this function.
6) Shared content server component 126 handles upload & real time sharing and/or conversion of uploaded files into PDF or other viewable formats such as .mp4, .mov and .jpg for purposes of achieving shared browsing and interaction with the same uploaded content. This component serves as the intelligence and guardian layer that pulls files from the storage server based upon validating access to the relevant file.
7) Cloud browser 104 serves as the component that actually fetches the online content while replicating and executing the individual online interactions of the leader(s) that take place within said pages or other forms of content while then rendering and encoding the individual frames that are fed into encoder 106.
8) Encoder 106 serves as the component that receives raw frame data from the cloud browser 104 in order to curate between frame changes and other required frames in order to create one or more encoded streams (depending on whether multiple browser tab display or element redaction is required as it relates to the non-preferred implementation referenced above) which are then transmitted for distribution by synchronization server 102.

FIG. 2A exhibits a consolidated server implementation of a system for providing a shared online experience session in communication with a session initiating device and an invitee device during a login and authentication process, according to one implementation. As shown by FIG. 2A, server 240 includes processor 244, and memory 246 implemented as a computer-readable non-transitory storage medium. According to the exemplary implementation shown in FIG. 2A, memory 246 of server 240 stores software code 242, cloud browser 204, encoder 206, and session identification database 248. It is noted that server 240 may include some or all of components 1 through 8 described above by reference to FIG. 1B. On this note and in addition to the features shown in FIG. 2A, server 240 may include or provide any or all of synchronization server 102, MGMT 114, dashboard portal 116, real-time component 118, internal 122 and external 124 storage servers, and shared content server 126. Also shown in FIG. 2A are exemplary session initiating device 210, invitee device 212, initiation request 230, confirmation message 232, session invitation 234, request to join 236, notification 238, and session identifier 228.

It is noted that either a host device or a non-host device may serve as session initiating device 210, and it is further noted that either a host device or a non-host device may serve as invitee device 212. Thus, in various implementations one of session initiating device 210 or invitee device 212 may be a host device while the other of session initiating device 210 or invitee device 212 may be a non-host device, both of session initiating device 210 and invitee device 212 may be host devices, or both of session initiating device 212 and invitee device 212 may be non-host devices.

It is also noted that although the implementation described by reference to FIG. 2A describes session invitation 234 as being transmitted from session initiating device 210 to invitee device 212, that representation is provided merely by way of example. In other implementations, session invitation 234 may be transmitted to invitee device 212 by server 240, rather than by session initiating device 210. Moreover, session invitation 234 is typically generated by sever 240, rather than by session initiating device 210. Thus, in various implementations, session invitation 234 may be generated by server 240, be transmitted to session initiating device 210 by server 240, and may be transmitted anew to invitee device 212 by session initiating device 210, as depicted in FIG. 2A, or may be generated by server 240 and transmitted to invitee device 212 by server 240, as also depicted in FIG. 2A.

Cloud browser 204 and encoder 206 correspond respectively in general to cloud browser 104 and encoder 106, in FIGS. 1A and 1B. Consequently, cloud browser 204 and encoder 206 may share any of the characteristics attributed to respective cloud browser 104 and encoder 106 by the present disclosure, and vice versa.

Although the present application refers to software code 242, cloud browser 204, encoder 206, and session identification database 248 as being stored in memory 246 for conceptual clarity, more generally memory 246 may take the form of any computer-readable non-transitory storage medium. The expression "computer-readable non-transitory storage medium," as used in the present application, refers to any medium, excluding a carrier wave or other transitory signal that provides instructions to processor 244 of server 240. Thus, a computer-readable non-transitory medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory media include, for example, optical discs, RAM, programmable read-only memory (PROM), erasable PROM (EPROM), and FLASH memory.

Moreover and although FIG. 2A depicts software code 242, cloud browser 204, encoder 206, and session identification database 248 as being co-located in memory 246, that representation is also provided merely as an aid to conceptual clarity. More generally, server 240 may include one or more computing platforms, which may be co-located, or may form an interactively linked but distributed system, such as a cloud-based system, for instance. As a result, processor 244 and memory 246 may correspond to distributed processor and memory resources of server 240, while one or more of software code 242, cloud browser 204, encoder 206, and session identification database 248 may be stored remotely from one another.

Processor 244 may include multiple hardware processing units, such as one or more central processing units, one or more graphics processing units, one or more tensor processing units, one or more field-programmable gate arrays (FPGAs), and an application programming interface (API) server, for example. By way of definition, as used in the present application, the terms "central processing unit" (CPU), "graphics processing unit" (GPU), and "tensor processing unit" (TPU) have their customary meaning in the art. On this note, a CPU includes an Arithmetic Logic Unit (ALU) for carrying out the arithmetic and logical operations of server 240, as well as a Control Unit (CU) for retrieving programs, such as software code 242, from memory 246, while a GPU may be implemented to reduce the processing overhead of the CPU by performing computationally intensive graphics or other processing tasks. A TPU is an application-specific integrated circuit (ASIC) configured specifically for AI applications such as machine learning modeling.

In various implementations, server 240 may correspond to one or more web servers, accessible over a packet-switched network such as the Internet, for example. Alternatively, server 240 may correspond to one or more computer servers supporting a private wide area network (WAN), local area network (LAN), or included in another type of limited distribution or private network. In addition, or alternatively, in some implementations, server 240 may utilize a local area broadcast method, such as User Datagram Protocol (UDP) or Bluetooth, for instance. Furthermore, in some implementations, server 240 may be implemented virtually, such as in a data center. For example, in some implementations, server 240 may be implemented in software, or as virtual machines.

To initiate a shared online experience session, session initiating device 210 transmits initiation request 230 to server 240. In response to initiation request 230, server 240 may transmit confirmation message 232 to session initiating device 210, including session identifier 228. In exemplary implementations, session identifier 228 may comprise an identification number, passkey, URL, MAC address, or other unique indicator such that the shared online experience session may be identified for joining the session.

Once the shared online experience session is established and session identifier 228 is transferred to session initiating device 210, session initiating device 210 or server 240 may directly transmit session invitation 234 to prospective invitee devices, such as invitee device 212. In other implementations, other session attendees may transmit session invitation 234 to additional prospective invitees. Session invitation 234, to be described in detail below for discussion of FIG. 2B, may comprise an invitation hyperlink and session identifier 228.

If the user of invitee device 212 decides to join the shared online experience session being initiated by session initiating device 210 in conjunction with server 240, invitee device 212 transmits the request to join 236 to server 240. The request to join 236 is a data communication sent to server 240 by a prospective invitee device that includes session identifier 228.

After server 240 receives the request to join 236 from invitee device 212, server 240 records identification and routing information of invitee device 212, such as IP address, MAC address, or other unique identifiers, in order to relay information in the shared online experience session to invitee device 212. In exemplary implementations, server 240 may then transmit notification 238 to session initiating device 210, informing session initiating device 210 that invitee device 212 has joined the shared online experience session.

FIG. 2B illustrates a flow chart of method 250 utilized by session initiating device 210 for the initiation of a shared online experience session after the activation of a hyperlink or other online element from a website or other form of online content that is suitable for activation such as a button, hot key trigger or a "join a room" element. Method 250 is utilized by session initiating device 210 to initiate a shared online experience session with invitee device 212 through server 240. Method 250 is described in the order shown in FIG. 2B; however, the following actions may be taken in any other conceivable sequence without deviating from the scope of the inventive aspects of the present disclosure. In addition and since the system described herein is optimally designed to run on an install, engineering and code-free basis, alternative preferred implementations (hereinafter known as "Code and Install-free Implementations") may not require the software download and acceptance process described by reference to method 250.

In action 251, session initiating device 210 initiates activation of a hyperlink from a website hosted by a web server. In action 252, session initiating device 210, in response to the initiation of the activation hyperlink, attempts to detect if synchronized browsing software is installed or ready to launch or run on session initiating device 210. If the synchronized browsing software is not detected on session initiating device 210 but is required, session initiating device 210 proceeds to action 253. If, however, the synchronized browsing software is detected or is not required, session initiating device 210 proceeds to action 254.

In action 253, session initiating device 210 sends a communication to server 240 requesting to download synchronized browsing software. In exemplary implementations, server 240 transmits synchronized browsing software to session initiating device 210. In implementations wherein the synchronized browsing software needs to be installed in order for the software to run, session initiating device 210 installs the synchronized browsing software. Once the software is installed, session initiating device 210 proceeds to action 254. In implementations wherein the synchronized browsing software does not need to be installed and once the download is completed, session initiating device 210 proceeds to action 254.

In action 254, session initiating device 210 sends initiation request 230 to server 240. In action 255, session initiating device 210 receives confirmation message 232 from server 240, indicating that a shared online experience session has been established. In exemplary implementations, confirmation message 232 transmitted to session initiating device 210 comprises session identifier 228.

In action 256, session initiating device 210 or server 240 sends session invitation 234 to one or more prospective guests, such as invitee device 212, to join the shared online experience session. In exemplary implementations, session invitation 234 may include session identifier 228, and an invitation hyperlink to join the shared online experience session. The prospective guests need to simply click the invitation hyperlink included in session invitation 234 to join the shared online experience session. In other implementations, session invitation 234 may also include an image or message from the user of session initiating device 210 to the user of invitee device 212 or to other hosts and/or non-hosts.

In some implementations, session invitation 234 to join a shared online experience session may be sent to, or received by, prospective invitee device 212 or to other prospective host or non-host devices, in numerous ways. In one implementation, session invitation 234 may be sent by session initiating device 210 or server 240 to invitee device 212 via an email message. In another implementation, session invitation 234 may be sent to or by invitee device 212 via an instant message communication. In yet other implementations, session invitation 234 may be sent to or by invitee device 212 via a social networking communication. It's important to note that in some implementations, there may be separate invitations for each user's role once he or she initiates and/or enters a session. For example, a host may trigger a private and secure link invitation that is only intended for users who are able to view sensitive information during the shared browsing session and that non-hosts may trigger public or open link invitations that are intended for users who are only able to view redacted versions of the subject content during the shared online experience session.

Generally speaking, it is important to note that clicking and/or activating an invitation link is only one mechanism for having a prospective participant join or initiate shared online experience sessions. As one example, participant hosts and non-hosts are also able to initiate or join sessions by entering an active session number into a "Join a Room Box" element for initiating a new session and/or for joining an existing session.

Alternatively, session invitation 234 may be displayed publicly or semi-privately on a website for viewers to click or activate. In such implementations, session invitation 234 is not sent to invitee device 212, but rather is publicly displayed on a website so that anyone who views the invitation can activate it to enter into the shared online experience session. For example, should the user of session initiating device 210 "tweet" an invitation to join a shared online experience session through the social communication website TWITTER®, any reader may accept the invitation by clicking on the shared hyperlink. In other implementations and/or via integration APIs or direct manual means, a user of session initiating device 210, invitee device 212 and/or server 240 itself may post a public invitation through FACEBOOK®, INSTAGRAM®, a website newsfeed, any other form of online content, or as a hyperlink on a website, game, virtual world, metaverse, or other application, in order to issue an open invitation to certain prospective users or the public at large to join their shared online experience session.

Finally, in action 257, session initiating device 210 and/or other session participants may receive notification message 238 from server 240 that one or more non-host devices have joined the shared online experience session. In an exemplary implementation, session initiating device 210 receives notification message 238 for each guest device, such as invitee device 212, that has joined the shared online experience session. In such an implementation, notification message 238 may comprise a visual, audio, or textual output through session initiating device 210. In yet other implementations, session initiating device 210 may receive notification message 238 for only the first non-host device that has joined the shared online experience session. Alternatively, session initiating device 210 and/or other session participants may receive notification message 238 for only designated non-host devices that have joined the shared online experience session, such as those that have been made a priority, through trusted contacts, or by some other means of designation. Alternatively, session initiating device 210 may not receive any notifications at all as it relates to entrants into the session.

FIG. 3 illustrates flowchart 360 of a method utilized by server 240 for the initiation of a shared online experience session. The method outlined by flowchart 360 is utilized by server 240 to initiate a shared online experience session between session initiating device 210 and invitee device 212. It is noted that although the method outlined by flowchart 360 is described in the order shown in FIG. 3, the actions included in flowchart 360 may be performed in any other conceivable sequence without deviating from the scope of the present concepts.

In action 361 and as previously discussed and illustrated in FIGS. 2A and 2B, server 240 receives initiation request 230 from session initiating device 210. In action 362, server 240 establishes a shared online experience session, hosted by session initiating device 210, and generates session identifier 228. In action 363, server 240 records session identifier 228 and the routing information of session initiating device 210 within a session identification database in memory 246 of server 240 (session identification database not shown in FIG. 2A).

In action 364, server 240 transmits confirmation message 232 to session initiating device 210, confirming the establishment of the shared online experience session, wherein confirmation message 232 includes the transmittal of session identifier 228 to session initiating device 210.

In action 365, server 240 may receive a request to join 236 from a prospective guest device, such as invitee device 212. In exemplary implementations, request to join 236 comprises a data communication requesting to join the shared online experience session, wherein the communication includes session identifier 228. In action 366 and in response to receiving request to join 236, server 240 records the routing and identification information of invitee device 212 within the session identification database in association with session identifier 228, such that server 240 may later relay data sent from session initiating device 210 to invitee device 212.

In actions 367 and 368, server 240 generates and transmits notification 238 to session initiating device 210, wherein notification 238 includes a confirmation message that invitee device 212 has joined the shared online experience session. In exemplary implementations, notification 238 includes the identification information of invitee device 212.

Figure 4:
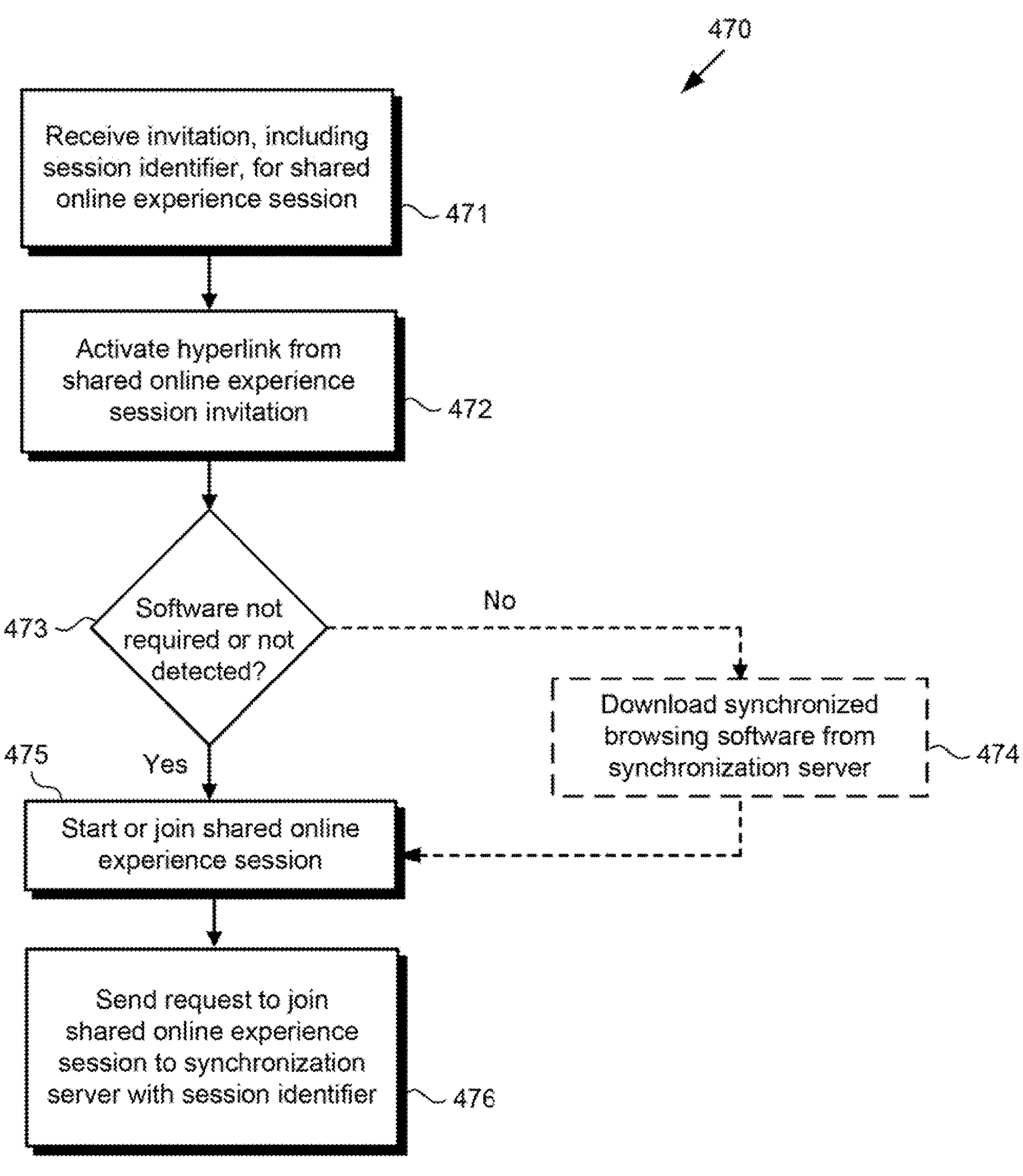
FIG. 4 shows a flowchart of a method utilized by an invitee device to accept and join a shared online experience session, according to one implementation.

FIG. 4 illustrates flowchart 470 of a method utilized by invitee device 212, which may be a host device or a non-host device, for the acceptance and joining of a shared online experience session. The method outlined by flowchart 470 is utilized by invitee device 212, to accept and join a shared online experience session by activating an invitation hyperlink. It is noted that although the method outlined by flowchart 470 is described in the order shown in FIG. 4, the actions included in flowchart 470 may be performed in any other conceivable sequence without deviating from the scope of the present concepts.

In action 471, invitee device 212 receives session invitation 234 which includes an invitation hyperlink and session identifier 228. Session invitation 234 may comprise, but is not limited to, data communication, such as email, instant message or text, SMS, or a public or private internet posting, such as through social networking, applications, blogs, virtual worlds, metaverse experiences and/or offerings (three dimensional and otherwise), games, news feeds or other online mediums.

In action 472, invitee device 212 activates the invitation hyperlink. In action 473, invitee device 212 detects if synchronized browsing software is installed or ready to launch on invitee device 212, if the synchronized browsing software is required. In an exemplary implementation, activation of the invitation hyperlink in action 472 prompts invitee device 212 to detect if the synchronized browsing software is present and capable of being run. If the synchronized browsing software is required but is not installed or ready to launch on invitee device 212, invitee device 212 proceeds to action 474. If, however, the synchronized browsing software is not required for any reason, is already installed or ready to launch on invitee device 212, invitee device 212 proceeds to action 474. Further, in implementations wherein the synchronized browsing software is not required to participate in a shared online experience session, invitee device 212 proceeds to action 476.

In action 474, invitee device 212 transmits a request to download the synchronized browsing software to server 240. Once invitee device 212 has downloaded the synchronized browsing software and the software is ready to launch, invitee device 212 proceeds to action 475. In action 475, invitee device 212 starts or joins the shared online experience session. In action 476, invitee device 212 transmits request to join 236 to server 240, including session identifier 228.

Figure 5A:
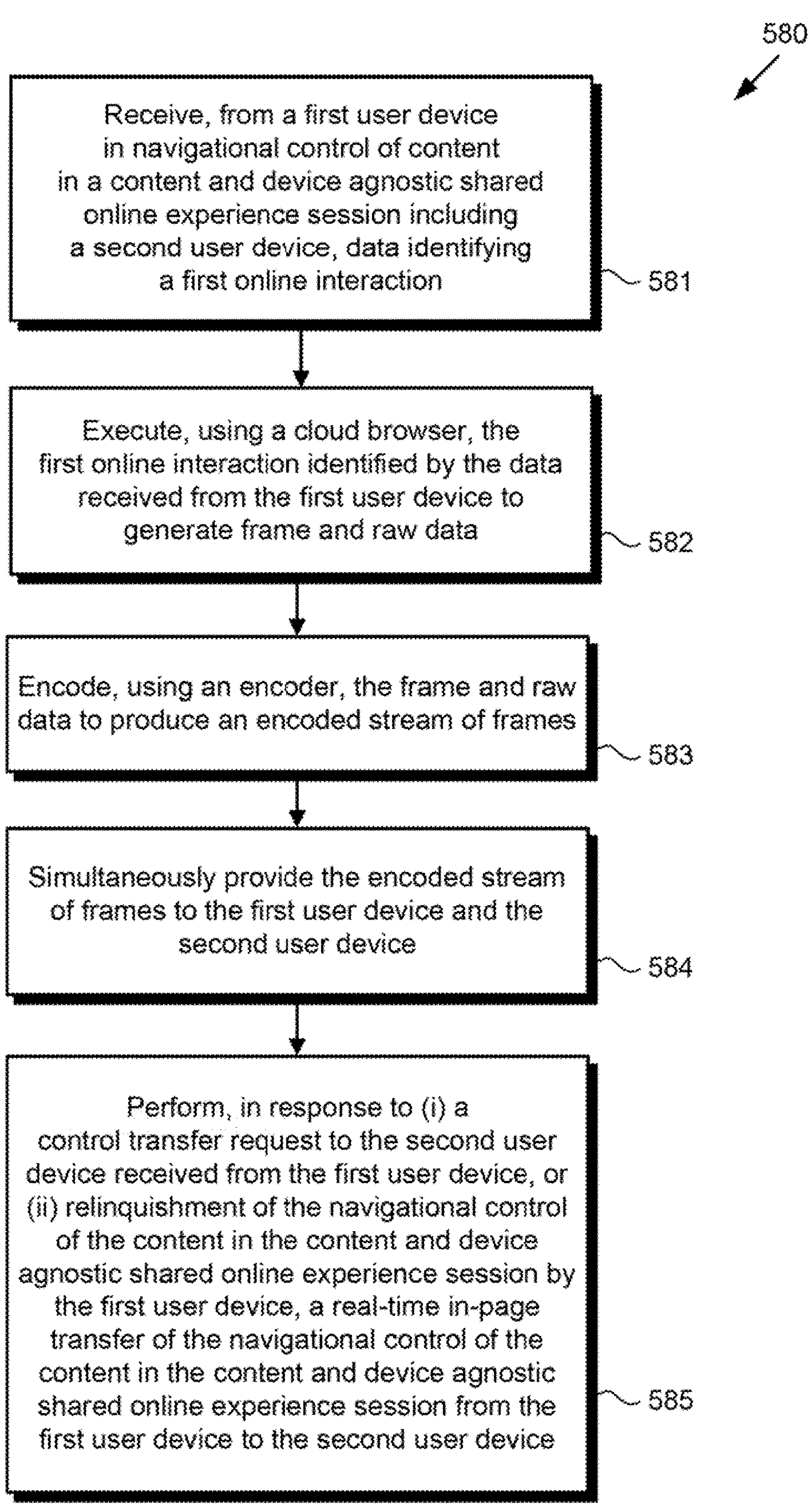
FIGS. 5A and 5B show a flowchart presenting an exemplary method for providing a shared online experience session, according to one implementation.
Figure 5B:
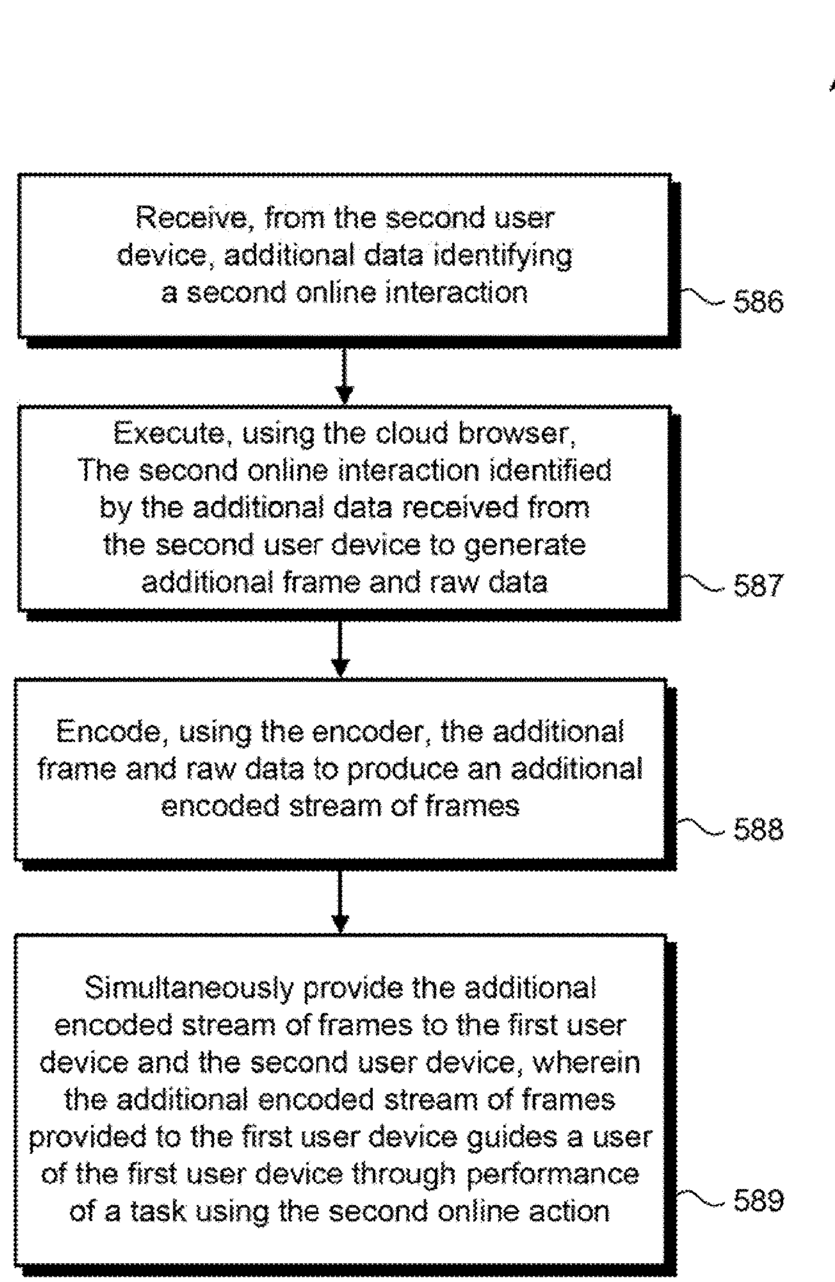

The functionality of server 240 and software code 242, as well as that of the systems shown in and described by reference to FIGS. 1A and 1B, will be further described by reference to FIGS. 5A, 5B, and 6. FIGS. 5A and 5B show flowchart 580 presenting an exemplary method for providing a shared online experience session, according to one implementation. With respect to the method outlined in FIGS. 5A and 5B, it is noted that certain details and features have been left out of flowchart 580 in order not to obscure the discussion of the inventive features in the present application. Moreover, it is noted that although the method outlined by flowchart 580 is described below with specific reference to FIG. 6, that method may be performed by systems for providing a shared online experience session shown by, and described by reference to, any of FIGS. 1A, 1B, and 2A.

Figure 6:
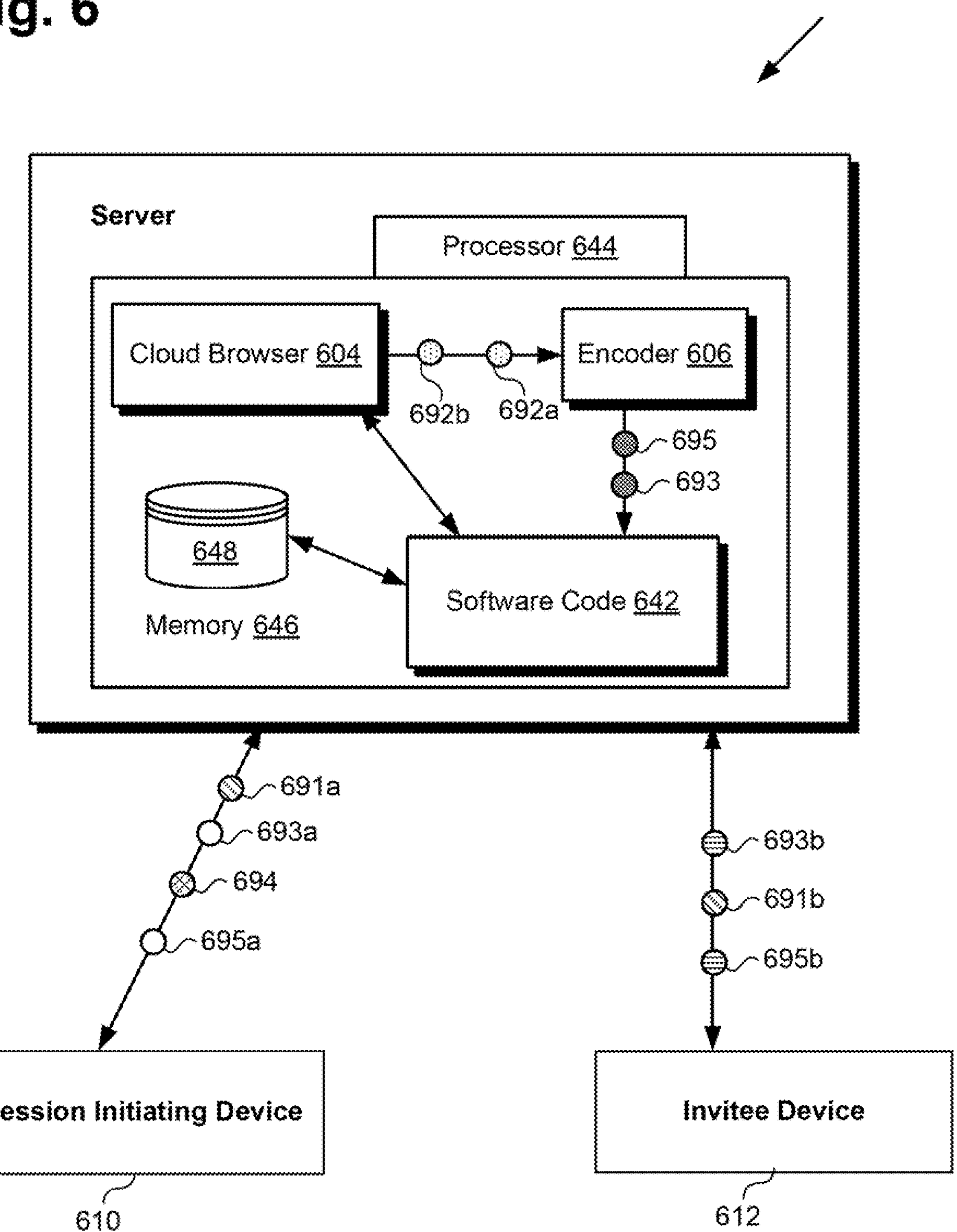
FIG. 6 shows the consolidated server implementation of FIG. 2A in communication with a session initiating device and an invitee device during a shared online experience session, according to one implementation.

FIG. 6 shows the consolidated server implementation described above by reference to FIG. 2A, in communication with session initiating device 610 and an invitee device 612 during a shared online experience session, according to one implementation. As shown by FIG. 6, server 640 includes processor 644, and memory 646 implemented as a computer-readable non-transitory storage medium. According to the exemplary implementation shown in FIG. 6, memory 646 of server 640 stores software code 642, cloud browser 604, encoder 606, and session identification database 648. It is noted that server 640 may include some or all of components 1 through 8 described above by reference to FIG. 1B. That is to say and in addition to the features shown in FIG. 6, server 640 may include or provide any or all of synchronization server 102, MGMT 114, dashboard portal 116, real-time component 118, internal 122 and external 124 storage servers, and shared content server 126. Also shown in FIG. 6 are data 691*a* and additional data 691*b*, frame and raw data 692*a*, additional frame and raw data 692*b*, encoded stream of frames 693, additional encoded stream of frames 695, unredacted version 693*a* of encoded stream of frames 693, redacted version 693*b* of encoded stream of frames 693, unredacted version 695*a* of additional encoded stream of frames 695, redacted version 695*b* of additional encoded stream of frames 695, and control transfer request 694.

Server 640 including processor 644, memory 646, software code 642, cloud browser 604, encoder 606, and session identification database 648 corresponds in general to server 240 including processor 244, memory 246, software code 242, cloud browser 204, encoder 206, and session identification database 248, in FIG. 2A. Consequently, server 640 including processor 644, memory 646, software code 642, cloud browser 604, encoder 606, and session identification database 648 may share any of the characteristics attributed to server 240 including processor 244, memory 246, software code 242, cloud browser 204, encoder 206, and session identification database 248 cloud browser 104 and encoder 106 by the present disclosure, and vice versa. In addition, session initiating device 610 and invitee device 612 correspond respectively to session initiating device 210 and invitee device 212, in FIG. 2. As a result, session initiating device 610 and invitee device 612 may share any of the characteristics attributed to respective session initiating device 210 and invitee device 212 by the present disclosure, and vice versa.

It is noted that although FIG. 6 shows a single invitee device 612, that representation is merely in the interests of conceptual clarity. In various implementations, invitee device 612 may correspond to a single invitee device used by a single user, or to multiple invitee devices each used by a respective user.

Referring to FIGS. 5A and 6 in combination, flowchart 580 includes receiving, from a first user device (hereinafter "session initiating device 610") in navigational control of content in a shared online experience session including a second user device (hereinafter "invitee device 612"), data 691 describing an online interaction (hereinafter "first online interaction") by a user of session initiating device 610 (action 581). The first online interaction may be a navigational event to a website or other content-based interaction via the typing of a particular URL within a web browser or taking any other affirmative interaction within a web browser, mobile application, desktop app or other form of online medium, experience or device. Alternatively, the first online interaction may be navigation within the subject webpage or other form of online content. In some implementations, the first online interaction may identify a task for performance by the user of session initiating device 610 on and/or within the website of the third party entity, which would include, but would certainly not be limited to: (1) interacting with online content elements such as dropdown menus, input boxes or div layers; (2) starting, pausing and/or skipping through video or rich media content; (3) scrolling within web content; (4) navigating an avatar through a virtual world or metaverse experience; and (5) other types of online interactions. Data 691 identifying the first online interaction may be received in action 581 by processor 644 of server 640. In some implementations, for example, data 691 may be received using software code 642, executed by processor 644.

In some implementations, a first party entity publisher who may be actively participating in the implementation of the system and who is hosting a website on which the user of session initiating device 610 has previously begun performance of certain tasks. These tasks can include, but are not limited to, uploading session information such as already submitted input box information, partially filled forms and other forms of data such as authentication tokens, prior to session initiation so that these elements are capable of being instantly reflected when the shared online experience session starts. This feature may be especially helpful if an online user is coming into the shared online experience session directly from a solitary site experience or the user of session initiating device 610 was already logged into the subject site prior to the initiation of the shared online experience session. The following details describe how this process may work in practice:

(1) The "uploading of pre-session data" is part of a session creation process;

(2) Server 640 may include an API (such as a Server Side REST API) that interacts with MGMT 114, in FIG. 1B, to transfer this information at session initiation; and (3) When the session begins, server 640 may fetch the session data or customizations for the session and may initiate cloud browser 604 with the appropriate data prior to having cloud browser 604 fetch the relevant content for delivery to server 640. In effect, server 640 is helping cloud browser 604 recreate the states that the user of session initiating device 610 was privy to prior to initiation of the shared online experience.

Selection Between Desktop, Mobile and Other Forms of Content Within the Shared Online Navigation Path As it relates to online content, most site experiences serve at least two forms of content to their online visitors: desktop versions for computers and mobile optimized content for a plethora of mobile devices. In addition to these two forms of content, other site experiences offer specialized versions such as those that are designed for three-dimensional virtual reality (VR) experiences, tablets, VR headsets and/or other types of devices or experiences. In one implementation of the present disclosure and based upon presented factors such as the user agent that is utilized by the cloud browser and external web site server that returns the requested content, the system may select amongst desktop, mobile, VR and/or other versions of content such as those which are intended for mobile tablets based upon the type of device that the leading device is using to access the system. For example and if the leader is accessing the system via a mobile device, all participants in the session may view the mobile version of the web content even if one or more of the followers are accessing the system from a desktop computer and/or browser. Within this realm and if the leading user passes control to a desktop user, the transmitted site experience may shift to the desktop view on a mid-session basis to reflect the new access point for the new leader on a desktop computer. In addition and in the exemplary event that there are multiple leaders on different types of devices, the majority number of the users who share the same access type may be the decisional factor in determining between desktop and mobile content. In other implementations, the system may allow the site administrators to unilaterally select amongst desktop, mobile, VR or other specialized user agent settings such as mobile tablets so that all participants receive that same form of content irrespective of the types of devices that the leader or other participants are utilizing to access the system. In yet other implementations, it may be possible to serve the desktop version of the content experience to users on desktop devices while serving the mobile version to users on mobile devices in a manner that materially parallels the double transmission component of the present disclosure as it relates to how the system treats redacted versus non-redacted content (set forth below in the How Screen Redaction Works summary).

Handling of Partially Filled Data (or Partially Completed Application Forms) Prior to Session Initiation and After Session Conclusion At the beginning of the session initiation process, the API can enable server 640 to upload the data that the participating first or third party content publisher(s) have access to within a partially filled form. Within this process, sever 640 can upload data that the API has access to and, for the user of session initiating device 610, that may even include sensitive information such as credit card numbers, although the user of invitee device 612 who is engaging in the shared online experience session with the user of session initiating device 610 would typically see a redacted version of the webpage or other online content in which case the sensitive information relating to the user of session initiating device 610 would be blacked out, obscured or obfuscated.

Conversely and at the termination point of a session, there could be session data such as a mortgage application form that was partially filled out within the shared online experience session; in this process and when the user of session initiating device 610 exits the session, server 640 can then push and/or populate this data back into the host user's own browser or application so that the user of session initiating device 610 can resume the online experience on a solitary basis from where she or he left off prior to termination of the shared online experience session.

Continuing to refer to FIGS. 5A and 6 in combination and in using the cloud browser 604, flowchart 580 further includes executing the first online interaction identified by the data received from host device 619 to generate frame and raw data 692*a* (action 582). The present content and device agnostic online experience sharing solution utilizes the rendering source code components behind browsers like the Chromium Projects (the code base behind Chrome and other browsers like Microsoft Edge) to create a GPU accelerated component referred to herein as the "cloud browser" (e.g., cloud browser 604). The portion of the code that is utilized in developing and updating the cloud browser 604 is typically heavily customized and substantially limited in terms of use and function to produce the most efficient framework possible in terms of performance. Within this process and when the user of session initiating device 610 performs online interactions within a website, mobile application page, VR experience or any other form of online content or experience, the present solution renders the components directly to a GPU surface—a high performance memory structure within the GPU.

In action 582, cloud browser 604 generates raw, continuously captured frame and raw data 692*a* of the result of executing the first online interaction identified by data 691 received in action 581 and transmits frame and raw data 692*a* to encoder 606. Action 582 may be performed by processor 644 of server 640, using cloud browser 604. In some implementations, for example, action 582 may be performed by software code 642, executed by processor 644, and using cloud browser 604.

Continuing to refer to FIGS. 5A and 6 in combination, flowchart 580 further includes encoding, using encoder 606, frame and raw data 692*a* to produce encoded stream of frames 693 (action 583). Encoder 606 is the component that receives the raw, continuously captured frame and raw data generated by cloud browser 604. Within this process, encoder 606 is configured to curate and process frame and raw data 692*a* to determine what portions of frame and other raw data have been modified relative to a previous instance or series of frame and other raw data. Encoder 606 can then output a highly efficient encoded stream as encoded stream of frames 693 to materially minimize latency and achieve much lower device and bandwidth utilization levels versus conventional collaboration mediums such as screen sharing and/or remote desktop. Encoding of frame and raw data 692*a* to produce encoded stream of frames 693, in action 583, may be performed by processor 644 of server 640, using encoder 606. In some implementations, for example, action 583 may be performed by software code 642, executed by processor 644, and using encoder 606.

Continuing to refer to FIGS. 5A and 6 in combination, flowchart 580 further includes simultaneously, or contemporaneously, providing encoded stream of frames 693 to session initiating device 610 and invitee device 612 (action 584). It is noted that the initial role of server 640, in actions 581 and 582, is to detect and pass instructions to cloud browser 604 to replicate and execute the online interactions actions of the user of session initiating device 610 (or the leading device(s)). The subsequent broadcast role of server 640 is to serve the contemporaneously encoded stream of frames that is produced by the encoder in response to receiving frame and raw data from cloud browser 604, which is continuously fetching the required content from the applicable web servers to execute the online interactions of the user of session initiating device 610 in real-time.

Action 584 may be performed by processor 644 of server 640, for example using software code 642. In some implementations, the same encoded stream of frames 693 may be contemporaneously provided to session initiating device 610 and invitee device 612 in action 584. However, in other implementations, as shown in FIG. 6, encoded stream of frames 693 may include unredacted version 693*a* of encoded stream of frames 693 and redacted version 693*b* of encoded stream of frames 693, wherein unredacted version 693*a* is provided to session initiating device 610 and redacted version 693*b* is simultaneously provided to invitee device 612 in action 584. It is noted that redacted version 693*b* of encoded stream of frames 693 blacks out or otherwise obscures sensitive information such as credit card numbers, social security numbers, and other designated content elements to prevent a user of invitee device 612 from viewing or accessing that information.

Element Redaction

In one non-preferred implementation, server 640 is transmitting the encoded stream of frames twice to achieve element redaction on the non-host side. Within this particular implementation and as for the two transmissions, the non-redacted version is transmitted to the host and the redacted version is transmitted to the non-host. Within this process and when element redaction is activated, the performance of server 640 is less efficient than just sending the non-redacted version of the encoded stream of frames to each of session initiating device 610 and invitee device 612.

In this implementation, unredacted version 693*a* of encoded stream of frames 693 is only for the session initiating device 610 (a totally clear rendition of the page) and the redacted version 693*b* of encoded stream of frames 693 includes affirmative obfuscation marks or element omissions within the encoded stream of frames where elements are blacked out or are otherwise obscured by cloud browser 604. When the users of session initiating device 610 scroll or if they are viewing the page in a resting state, the user of the non-host device is unable to see the sensitive screen contents because cloud browser 604 knows to mark that component with an obfuscating marking such as a black box (even as the user of session initiating device 610 scrolls).

Within screen redaction, server 640 is telling cloud browser 604 which elements need to be redacted as part of the setup from MGMT 114, in FIG. 1B, via an API so when the cookies, tokens or other elements are set, this component will define which fields or other elements are sensitive and which URLs can and cannot be browsed by the user of invitee device 612 (as one example). As another implementation, the redaction tags on the webpage or other form of content may be detected by cloud browser 604 itself so that it is empowered to obfuscate sensitive elements in real time before delivering the respective frames to the encoder.

In alternative implementations and to further speed up performance, all users, users of session initiating device 610 and invitee device 612, receive redacted version 693*b* and only session initiating device 610 (and/or other hosts) receive a single, superseding encoded stream containing the redacted information. This would mean that the page is served once most of the time (rather than the manner referenced above). This would be the preferred process because the performance of sending a single redacted version of the encoded stream of frames to all users is much faster and more efficient from a performance standpoint than sending two rendered encoded streams every time.

There are various ways that the present system allows for deployment of the element redaction feature. The methods include, but are certainly not limited to:

(1) Giving the online publisher who is participating in the functioning of the present system the ability to tag or identify fields, CSS elements on the webpage or other forms of content (within the publisher's own code base and/or via the cobrowse system's issuance of one or more cookies which include this information) for redaction designation purposes;

(2) Configuring cloud browser 604 to detect all input fields and then to make all input boxes redacted by default so non-host devices always receive redacted input boxes regardless of whether they are filled out or not;

(3) Cloud browser 604 can be programmed, equipped with machine learning on their own and/or trained with AI or other technologies to make all inputs of a certain variety (such as credit card or password inputs) into any input box auto-redacted for the non-hosts. For example, certain numerical patterns that are typical within credit card numbers can be identified and redacted. In this realm, PCI-DSS compliance requires that the non-authorized user not see the numbers that come after the first five credit card numerical inputs, so this process would ensure compliance. If a user types in a common sequence for a particular type of credit card such as the first five numbers, this pattern would be recognized and screen redaction would be auto-activated for this particular input box and/or all input boxes on this page. As an exemplary alternative, cloud browser 604 can be trained to identify entries within sensitive input boxes such as password or address fields so that it can redact those inputs as well in real time. Along these same lines, AI systems can be trained or can themselves identify certain types of content elements that would be redacted for non-hosts on an automated basis;

(4) Cloud browser 604 can be programmed, equipped with machine learning on their own and/or trained to identify certain fields such as password fields and to then only redact those fields or elements for non-hosts;

(5) Cloud browser 604 can be programmed, equipped with machine learning on their own and/or trained to identify certain words, phrases, images or other visual elements in order to redact those words, phrases, images or other visual elements from the view of users of non-host devices; and (6) Cloud browser 604 can be programmed, equipped with machine learning on their own and/or trained to identify certain common website or other online format class types and then redact those elements.

It is noted that although session initiating device 610 may initially be in control of the shared online experience session that also includes invitee device 612 (i.e. session initiating device 610 is initially the leader of the shared online experience session), server 640 advantageously enables real-time in-page transfer of the navigational control of the shared online experience session from session initiating device 610 to invitee device 612 in response to control transfer request 694 received from session initiating device 610. For further clarification, server 640 enables invitee device 612 to become the leader of the shared online browsing experience from a content navigational perspective while session initiating device 610 assumes the role of follower or shares leader status with the non-host device.

As noted above and in some implementations, session initiating device 610 may correspond to multiple host devices used by each of multiple respective host users who may jointly be in control of the shared online experience session. In those implementations, data 691 identifying the first online interaction describes a most recent online interaction executed by any one of multiple host devices 610, and server 640 enables the real-time in-page transfer of the navigational control of the shared online experience session from host devices 610 to invitee device 612 in response to control transfer request 694 being received from any one of multiple host devices 610. It is noted that although the exemplary method outlined by flowchart 580 describes performing a real-time in-page transfer of the navigational control of the shared online experience session from host device or devices 610 to invitee device 612 in response to receiving control transfer request 693, such a transfer may more generally be made in action in response to any affirmative action by any of host devices 610 indicating volitional relinquishment of navigational control of the shared online experience session by the user of that host device.

Thus, continuing to refer to FIGS. 5A and 6 in combination, in some implementations, flowchart 580 may further include performing, in response to (i) a control transfer request 693 to invitee device 612 received from session initiating device 610 or (ii) a relinquishment of the navigational control of the content in the shared online experience session, a real-time in-page transfer of the navigational control of the content interaction path in the shared online experience session from session initiating device 610 to invitee device 612 (action 585). Action 585 may be performed by processor 644 of server 640. For example, processor 644 may execute software code 642 to perform action 585. As noted above, the real-time in-page transfer of the navigational control of the shared online experience session from session initiating device 610 to invitee device 612 in action 585 can be made either in response to receiving control transfer request 693 or in response to any affirmative action by session initiating device 610 indicating volitional relinquishment of navigational control of the shared online experience session by the user of session initiating device 610.

It is noted that action 585 is optional, and in some use cases in-page transfer of the navigational control of the shared online experience session may be turned off. In those use cases, session initiating device 610 and invitee device 612 can concurrently engage in the shared online experience and will simultaneously, or contemporaneously, be provided encoded stream of frames 693 in action 684, but navigational control of the shared online experience session will be persistently vested in one of session initiating device 610 or invitee device 612.

It is further noted that in use cases in which action 585 is performed, the real-time in-page transfer of the control of the shared online experience session from session initiating device 610 to invitee device 612 transfers content navigational leadership of the shared online browsing session to invitee device 612 but has no effect on the roles of host and non-host. That is to say that although subsequent to action 586 invitee device 612 leads the shared online experience session and when redaction is activated, invitee device 612 will continue to receive only the redacted version of the encoded stream of frames within which sensitive information of the user of session initiating device 610 is obscured.

By way of example and in implementations where the user of session initiating device 610 is attempting to perform a task within any form of online content such as a third party entity or other online content source, invitee device 612 may be utilized by an agent of that third party entity and may be used to guide the user of session initiating device 610 through completion of the task without revealing sensitive information, such as a credit card number, to the agent of the third party entity. Thus, invitee device 612 may be used by a customer service representative or travel agent, for example, to assist a client user of host-device 610 to complete a desired task.

Referring to FIG. 5B in combination with FIG. 6 and in various shared online experience session use cases including those in which the user of invitee device 612 presently in control of the shared online browsing session is an agent of a third party site or other content format who is assisting the user of session initiating device 610 with performing a task, flowchart 580 may further include receiving, from invitee device 612, additional data 691*b* identifying a second online interaction performed using invitee device 612 (action 586). It is noted that action 586 may be performed by processor 644 of server 640, for example using software code 642, in a manner analogous to that described above by reference to action 581.

Continuing to refer to FIG. 5B in combination with FIG. 6, flowchart 580 may further include executing, using cloud browser 604, the second online interaction received from invitee device 612 to generate additional frame and raw data 692*b* (action 587). Action 587 may be performed by processor 644 of server 640, for example using software code 642 and cloud browser 604, in a manner analogous to that described above by reference to action 582.

Flowchart 580 may further include encoding, using encoder 606, additional frame and raw data 692*b* to produce additional encoded stream of frames 695 (action 588). Action 588 may be performed by processor 644 of server 640, for example using software code 642 and encoder 606, in a manner analogous to that described above by reference to action 583. As noted above by reference to action 583, encoder 606 may be configured to curate and process additional frame and raw data 692*b* to determine what portions of additional frame and raw data 692*b* have been modified relative to previous frame and raw data 692*a* (or series of frame and raw data that flow therefrom). Encoder 606 can then output a highly efficient encoded stream as additional encoded stream of frames 695 to substantially minimize latency and achieve much lower device utilization levels of CPU and bandwidth versus conventional collaboration mediums such as screen sharing and/or remote desktop. In other words, when encoding additional frame and raw data 692*b* to produce additional encoded stream of frames 695, processor 644 may be further configured to use encoder 606 to encode only data included in additional frame and raw data 692*b* generated by execution of the second online interaction that differs from data included in frame and raw data 692*a* generated by execution of the first online interaction.

Flowchart 580 may further include simultaneously, or contemporaneously, providing additional encoded stream of frames 695 to session initiating device 610 and invitee device 612 (action 589). Action 589 may be performed by processor 644 of server 640, for example using software code 642, in a manner analogous to that described above by reference to action 584. In some implementations, the same additional encoded stream of frames 695 may be provided to session initiating device 610 and invitee device 612 in action 590. However, in other implementations, as shown in FIG. 6, additional encoded stream of frames 695 may include unredacted version 695*a* of additional encoded stream of frames 695 and redacted version 695*b* of additional encoded stream of frames 695, wherein unredacted version 695*a* is provided to session initiating device 610 and redacted version 695*b* is simultaneously, or contemporaneously, provided to invitee device 612 in action 590, despite the fact that invitee device 612 is presently the leader of the shared online experience session that includes session initiating device 610. As noted above, redacted version 695*b* of additional encoded stream of frames 695 blacks out or otherwise obscures sensitive information such as credit card numbers, social security numbers, and the like to prevent the user of invitee device 612 from viewing or accessing that information.

It is noted that in implementations in which invitee device 612 is utilized by an agent of a third party entity or publisher having a website on which the user of host-device 610 is attempting to or desires to perform a task, additional encoded stream of frames 695 or 695*a* provided to session initiating device 610 may guide the user of session initiating device 610 through performance of the task using the second online interaction by invitee device 612.

Figures 7A, 7B:
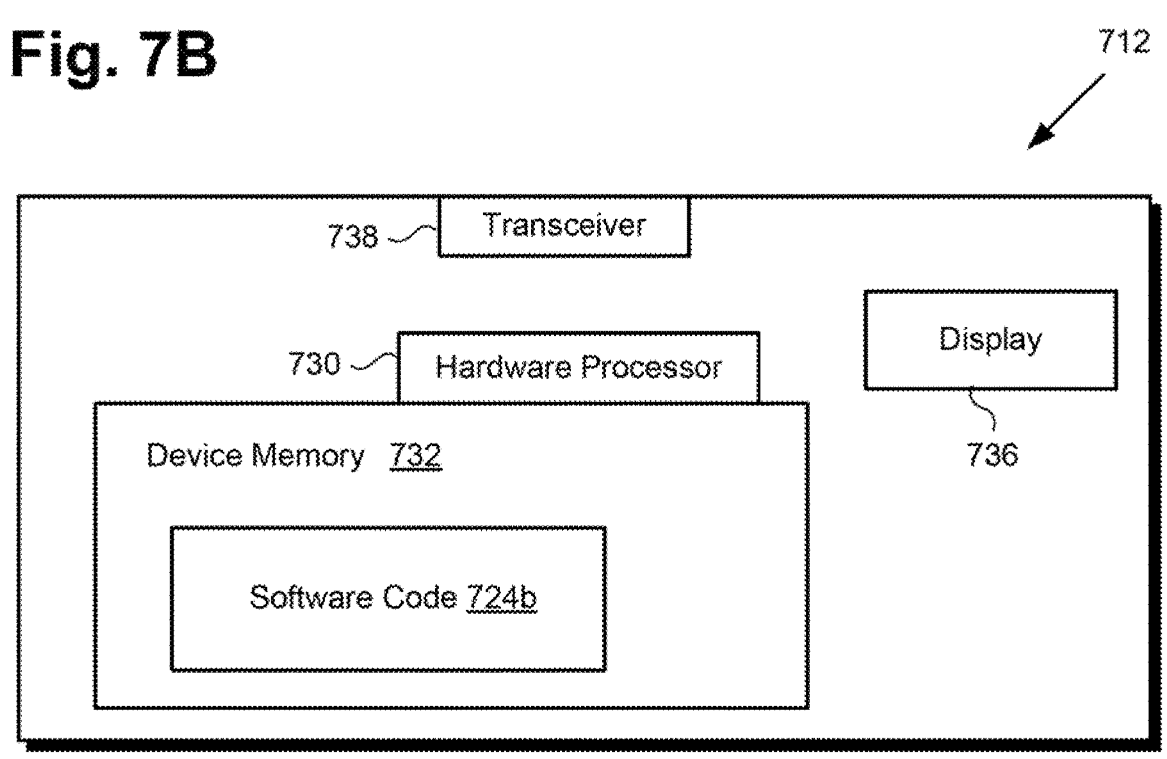
FIG. 7A shows a more detailed diagram of an exemplary session initiating device, according to one implementation.
FIG. 7B shows a more detailed diagram of an exemplary invitee device, according to one implementation.

FIG. 7A shows a more detailed diagram of exemplary session initiating device 710, according to one implementation, while FIG. 7B shows a more detailed diagram of exemplary invitee device 712, according to one implementation. As shown in FIG. 7A, session initiating device 710 includes hardware processor 720, device memory 722 implemented as a computer-readable non-transitory storage medium storing software code 724*a*, display 726, and transceiver 728. As shown in FIG. 7B, invitee device 712 includes hardware processor 730, device memory 732 implemented as a computer-readable non-transitory storage medium storing software code 724*b*, display 736, and transceiver 738.

Session initiating device 710 corresponds in general to session initiating device 210/610 in FIGS. 2A and 6. Consequently session initiating device 710 may share any of the characteristics attributed to session initiating device 210/610 by the present disclosure, and vice versa. Thus, like session initiating device 210/610 and, in some implementations, session initiating device 710 may be a host device, while in other implementations session initiating device 710 may be a non-host device. Moreover, like session initiating device 210/610 and, in some implementations, session initiating device 710 may be a shared online experience session leader device, while in other implementations session initiating device 710 may be a follower device during some or all of a shared online experience session, as the terms leader and follower are defined above. In addition and although not shown in FIG. 2A or 6, session initiating device 210/610 may include features corresponding respectively to hardware processor 720, device memory 722 implemented as a computer-readable non-transitory storage medium storing software code 724*a*, display 726, and transceiver 728.

Invitee device 712 corresponds in general to invitee device 212/612 in FIGS. 2A and 6. Consequently, invitee device 712 may share any of the characteristics attributed to invitee device 212/612 by the present disclosure, and vice versa. Moreover, like invitee device 212/612 and in some implementations, session initiating device 712 may be a shared online experience session leader device, while in other implementations session initiating device 712 may be a follower device during some or all of a shared online experience session, as the terms leader and follower are defined above. Thus, like invitee device 212/612 and in some implementations, invite device 712 may be a host device, while in other implementations session invitee device 712 may be a non-host device. In addition and although not shown in FIG. 2A or 6, invitee device 212/612 may include features corresponding respectively to hardware processor 730, device memory 732 implemented as a computer-readable non-transitory storage medium storing software code 724*b*, display 736, and transceiver 738.

It is noted that each of session initiating device 210/610/710 and invitee device 212/612/712 may be any suitable mobile or stationary computing device or system that implements data processing capabilities sufficient to support connections to a remote server that is configured to synchronize a shared online experience session and to implement the functionality ascribed to session initiating device 210/610/710 and invitee device 212/612/712 herein. For example and in other implementations, either of session initiating device 210/610/710 and invitee device 212/612/712 may take the form of a desktop computer, laptop computer, tablet computer, smartphone, smart wearable device such as a smartwatch and/or an augmented reality (AR) or VR device, for example.

Referring to FIGS. 7A and 7B in combination, hardware processors 720 and 730 of respective session initiating device 710 and invitee device 712 may include multiple hardware processing units, such as one or more CPUs, GPUs, TPUs, and FPGAs, for example, as those features are defined above. Device memories 722 and 732 may take the form of any computer-readable non-transitory storage media. As noted above, the expression computer-readable non-transitory storage medium refers to any medium, excluding a carrier wave or other transitory signal that provides instructions to a processor. Thus, a computer-readable non-transitory medium may correspond to various types of media, such as volatile media and non-volatile media, for example. Volatile media may include dynamic memory, such as dynamic RAM, while non-volatile memory may include optical, magnetic, or electrostatic storage devices. Common forms of computer-readable non-transitory media include, for example, optical discs, RAM, PROM, EPROM, and FLASH memory.

With respect to displays 726 and 736 of respective session initiating device 710 and invitee device 712, each of displays 726 and 728 may be implemented as a liquid crystal display (LCD), a light-emitting diode (LED) display, an organic light-emitting diode (OLED) display, a quantum dot (QD) display, or any other suitable display screen that performs a physical transformation of signals to light. Each of transceivers 728 and 738 of respective session initiating device 710 and invitee device 712 may be implemented as any suitable wireless communication unit. For example, transceivers 728 and 738 may include a fourth generation (4G) wireless transceiver and/or a 5G wireless transceiver. In addition, or alternatively, transceivers 728 and 738 may be configured for communications using one or more of the following (for example): Wireless Fidelity (Wi-Fi®), Worldwide Interoperability for Microwave Access (WiMAX®), Bluetooth®, Bluetooth® low energy (BLE), ZigBee®, radio-frequency identification (RFID), near-field communication (NFC), and 60 GHz wireless communications methods.

With respect to software code 724*a* and software code 724*b*, it is noted that in various implementations either or both of software code 724*a* and software code 724*b* may be or include browsing software, a browsing application, a mobile application, or any form of code operable on any web-enabled device. Alternatively, in some implementations, either or both of software code 724*a* and 724*b* may be synchronized browsing software code downloaded or otherwise received from remote server 240/640 in FIGS. 2A and 6.

Figure 8:
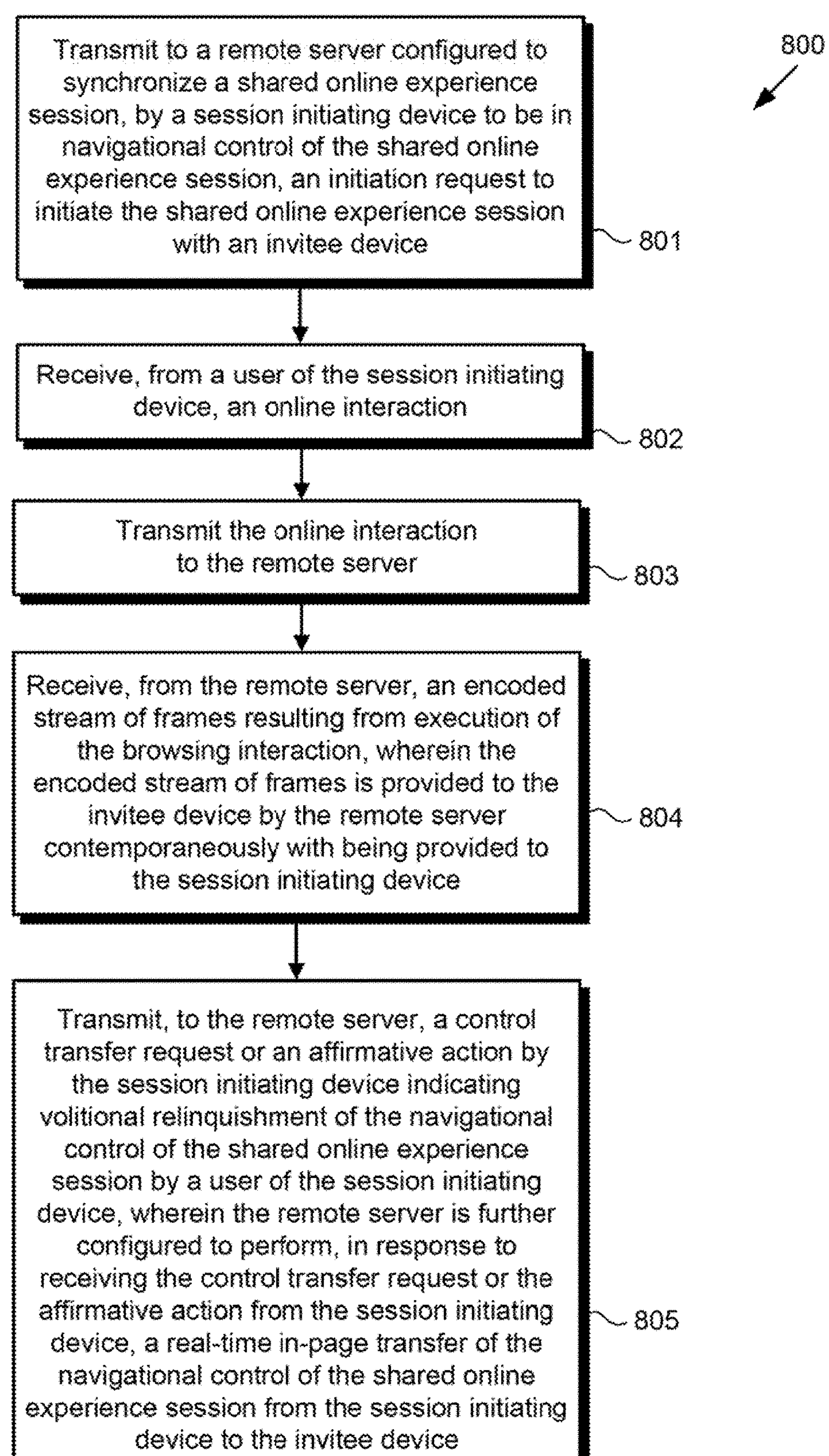
FIG. 8 shows a flowchart presenting an exemplary method for use by a session initiating device for engaging in a shared online experience session with an invitee device, according to one implementation.

FIG. 8 shows flowchart 800 presenting an exemplary method for use by session initiating device 210/610/710 in FIGS. 2A, 6, and 7A for engaging in a shared online experience session with invitee device 212/612/712 in FIGS. 2A, 6, and 7B, in which session initiating device 210/610/710 is to be in navigational control, according to one implementation. With respect to the method outlined in FIG. 8, it is noted that certain details and features have been left out of flowchart 800 in order not to obscure the discussion of the inventive features in the present application.

Referring to FIGS. 2A, 6, 7A, and 8 in combination, flowchart 800 includes transmitting to remote server 240/640 which is configured to synchronize a shared online experience by session initiating device 210/610/710 which is to be in navigational control of the shared online experience session, initiation request 230 which is to initiate the shared online experience session with invitee device 212/612/712 (action 801). Action 801 may be performed by software code 724*a* and executed by hardware processor 720 of session initiating device 210/610/710, as described above by reference to FIGS. 2A and 2B.

Continuing to refer to FIGS. 2A, 6, 7A, and 8 in combination, flowchart 800 further includes receiving, from a user of session initiating device 210/610/710, an online interaction (action 802). As noted above by reference to FIGS. 5A and 6 and for illustrative purposes only, an online interaction may be a navigational event to or within a website or other form of content via the typing of a particular URL within a web browser or the taking of any other affirmative interaction within a web browser, mobile application, desktop app or other form of online medium, experience or device. Alternatively, an online interaction may be a navigation within the subject webpage or other form of online content. In some implementations, the online interaction may identify a task for performance by the user of session initiating device 210/610/710 within any form of online content, which would include, but would certainly not be limited to:

(1) interacting with online content elements such as dropdown menus, input boxes or div layers; (2) starting, pausing and/or skipping through video content; (3) scrolling within web content; (4) navigating an avatar through a virtual world or metaverse experience; and (5) other types of online interactions. Action 802 may be performed by software code 724*a* and executed by hardware processor 720 of session initiating device 210/610/710.

Continuing to refer to FIGS. 2A, 6, 7A, and 8 in combination, flowchart 800 further includes transmitting the online interaction to remote server 240/640 (action 803). Action 803 may be performed by software code 724*a* and executed by hardware processor 720 of session initiating device 210/610/710.

Continuing to refer to FIGS. 2A, 6, 7A, and 8 in combination, with further reference to FIG. 7B, flowchart 800 further includes receiving, from remote server 240/640, encoded stream of frames 693 resulting from execution of the online interaction, wherein the encoded stream of frames is provided to invitee device 212/612/712 contemporaneously with being provided to session initiating device 210/610/710 (action 804). Encoded stream of frames 693 may be received, in action 804, by software code 724*a* and executed by hardware processor 720 of session initiating device 210/610/710. It is noted that the contemporaneous provision of encoded stream of frames 693 to session initiating device 210/610/710 and invitee device 212/612/712 is described above by reference to action 584 of flowchart 580, in FIG. 5A.

In some implementations, the method outlined by flowchart 800 may conclude with action 804, described above. However, and continuing to refer to FIGS. 2A, 6, 7A, 7B, and 8 in combination and in other implementations, the method outlined by flowchart 800 may further include transmitting, to remote server 240/640, control transfer request 694 or an affirmative action by session initiating device 210/610/710 indicating volitional relinquishment of the navigational control of the shared online experience session by a user of session initiating device 210/610/710 (action 805). It is noted that action 805 is optional, and in some use cases in-page transfer of the navigational control of the shared online experience session may be turned off. In those use cases, session initiating device 210/610/710 and invitee device 212/612/712 can concurrently engage in the shared online experience and will simultaneously, or contemporaneously, be provided encoded stream of frames 693 in action 804, but navigational control of the shared online experience session will be persistently vested in session initiating device 210/610/710.

In use cases in which action 805 is included in the method outlined by flowchart 800, action 805 may be performed by software code 724*a* and executed by hardware processor 720 of session initiating device 210/610/710. It is noted, as described above by reference to action 585 of flowchart 580 and in FIG. 5A, that remote server 240/640 is further configured to perform, in response to receiving control transfer request 694 or the affirmative action from session initiating device 210/610/710, a real-time in-page transfer of the navigational control of the shared online experience session from session initiating device 210/610/710 to invitee device 212/612/712.

FIG. 9 shows flowchart 900 presenting an exemplary method for use by invitee device 212/612/712 in FIGS. 2A, 6, and 7B for engaging in a shared online experience session with session initiating device 210/610/710, according to one implementation. With respect to the method outlined in FIG. 9, it is noted that certain details and features have been left out of flowchart 900 in order not to obscure the discussion of the inventive features in the present application.

Referring to FIGS. 2A, 6, 7B, and 9 in combination, flowchart 900 includes receiving from remote server 240/640 that is configured to synchronize a shared online experience, by invitee device 212/612/712 to be in navigational control of the shared online experience session, session invitation 234 to join the shared online experience session with session initiating device 210/610/710 (action 901). Action 901 may be performed by software code 724*b* and executed by hardware processor 730 of session invitee device 212/612/712, as described above by reference to FIGS. 2A and 4.

Continuing to refer to FIGS. 2A, 6, 7B, and 9 in combination, flowchart 900 further includes joining the shared online experience session with session initiating device 210/610/710 (action 902). Action 902 may be performed by software code 724*b* and executed by hardware processor 730 of session invitee device 212/612/712, as described above by reference to FIGS. 2A and 4.

Continuing to refer to FIGS. 2A, 6, 7B, and 9 in combination, flowchart 900 further includes receiving, from a user of invitee device 212/612/712, an online interaction (action 903). As noted above by reference to FIGS. 5A and 6, an online interaction may be a navigational event to or within a website or other form of online content via the typing of a particular URL within a web browser or the taking of any other affirmative interaction within a web browser, mobile application, desktop app or other form of online medium, experience or device. Alternatively, an online interaction may be navigation within the subject webpage or other form of online content. In some implementations, the online interaction may identify a task for performance by the user of invitee device 212/612/712 within any form of online content which would include, but would certainly not be limited to: (1) interacting with online content elements such as dropdown menus, input boxes or div layers; (2) starting, pausing and/or skipping through video content; (3) scrolling within web content; (4) navigating an avatar through a virtual world or metaverse experience; and (5) other types of online interactions. Action 903 may be performed by software code 724*b* and executed by hardware processor 730 of invitee device 212/612/712. Continuing to refer to FIGS. 2A, 6, 7B, and 9 in combination, flowchart 900 further includes transmitting the online interaction to remote server 240/640 (action 904). Action 904 may be performed by software code 724*b* and executed by hardware processor 730 of invitee device 212/612/712.

Continuing to refer to FIGS. 2A, 6, 7B, and 9 in combination, with further reference to FIG. 7A, flowchart 900 further includes receiving, from remote server 240/640, encoded stream of frames 693 resulting from execution of the online interaction, wherein the encoded stream of frames is provided to session initiating device 210/610/710 contemporaneously with being provided to invitee device 212/612/712 (action 905). The encoded stream of frames 693 may be received, in action 905, by software code 724*b* and executed by hardware processor 730 of invitee device 212/612/712. It is noted that the contemporaneous provision of encoded stream of frames 693 to invitee device 212/612/712 and session initiating device 210/610/710 is described above by reference to action 584 of flowchart 580, in FIG. 5A.

In some implementations, the method outlined by flowchart 900 may conclude with action 905, described above. However, and continuing to refer to FIGS. 2A, 6, 7A, 7B, and 9 in combination and in other implementations, the method outlined by flowchart 900 may further include transmitting, to remote server 240/640, control transfer request 694 or an affirmative action by invitee device 212/612/712 indicating volitional relinquishment of the navigational control of the shared online experience session by a user of invitee device 212/612/712 (action 906). It is noted that action 906 is optional, and in some use cases in-page transfer of the navigational control of the shared online experience session may be turned off. In those use cases, session initiating device 210/610/710 and invitee device 212/612/712 can concurrently engage in the shared online experience and will simultaneously, or contemporaneously, be provided encoded stream of frames 693 in action 905, but navigational control of the shared online experience session will be persistently vested in invitee device 212/612/712.

In use cases in which action 906 is included in the method outlined by flowchart 900, action 906 may be performed by software code 724*b* and executed by hardware processor 730 of invitee device 212/612/712. It is noted that, as described above by reference to action 585 of flowchart 580, in FIG. 5A, remote server 240/640 is further configured to perform, in response to receiving control transfer request 694 or the affirmative action from invitee device 212/612/712, a real-time in-page transfer of the navigational control of the shared online experience session from invitee device 212/612/712 to session initiating device 210/610/710.

Thus, the present application discloses a fully interactive, low-latency and ultra-secure content and device agnostic online experience sharing solution that features in-page control passing to uniquely empower multiple remote users to simultaneously interact with and/or pass control within the same webpage or other form of online content in a non-invasive manner. From the above description, it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A system for providing a simulated browsing session, the system comprising:

a cloud browser:

an application programming interface (API);

a plurality of artificial intelligence (AI) controlled agents; and a processor configured to:

receive, from a first AI controlled agent of the plurality of AI controlled agents, data identifying one or more online actions;

select, based on the one or more online actions, one or both of the cloud browser or the API for executing the one or more online actions;

execute the one or more online actions, using the one or both of the cloud browser or the API selected for executing the one or more online actions, to generate a result;

communicate, to each of the plurality of AI controlled agents, the result of executing the one or more online actions; and accept, from a second AI controlled agent of the plurality of AI controlled agents, another data identifying a subsequent online action determined autonomously by the second AI controlled agent based on at least one of the result of executing the one or more online actions or a task previously defined by a human user interacting with the first AI controlled agent;

wherein the first AI controlled agent and the second AI controlled agent participate in an independent and at least partially contemporaneous manner to advance the task.

2. The system of claim 1, wherein the subsequent online action is determined autonomously by the second AI controlled agent as a prediction based on the at least one of the result or the task.

3. The system of claim 1, wherein the system supports interaction by the human user with the first AI controlled agent using one or more of an online application or an online device.

4. The system of claim 3, wherein the one or more of the online application or the online device comprises at least one of a web browser, a computer application, a mobile application, or a web-enabled device.

5. The system of claim 1, wherein the plurality of AI controlled agents participate to advance the task in at least one of a competitive or collaborative manner.

6. The system of claim 1, wherein a third AI controlled agent of the plurality of AI controlled agents is a non-participant observer or supervisor of the simulated browsing session.

7. The system of claim 6, wherein the third AI controlled agent is configured to evaluate the one or more online actions identified by the data received from the first AI controlled agent.

8. The system of claim 1, wherein accepting the another data identifying the subsequent online action that is determined autonomously by the second AI controlled agent occurs after a condition for advancing the task is satisfied.

9. The system of claim 8, wherein the condition is pre-determined.

10. The system of claim 8, wherein the condition is determined dynamically during the simulated browsing session.

11. The system of claim 8, wherein before the condition is satisfied, the first AI controlled agent has exclusive navigational control over the simulated browsing session.

12. The system of claim 11, wherein the exclusive navigational control over the simulated browsing session is conditioned based on at least one of information or a permission provided by the human user.

13. The system of claim 11, wherein the processor is further configured to:

select, based on the subsequent online action, one or both of the cloud browser or the API for executing the subsequent online action;

execute the subsequent online action, using the one or both of the cloud browser or the API that is selected for executing the subsequent online action, to generate another result; and wherein each of the first AI controlled agent and the second AI controlled agent shares navigational control over the simulated browsing session after the subsequent online action is completed.

14. The system of claim 1, wherein navigational control over the simulated browsing session is passed between the first AI controlled agent and the second AI controlled agent during the simulated browsing session.

15. The system of claim 1, wherein the processor is further configured to:

maintain a record of the simulated browsing session identifying which of the plurality of AI controlled agents determines or executes each online action that is executed during the simulated browsing session.

16. The system of claim 1, further comprising:

a third AI controlled agent of the plurality of AI controlled agents;

wherein navigational control over the simulated browsing session is one of: (i) shared by the third AI controlled agent with at least one of the first AI controlled agent or the second AI controlled agent, or (ii) passed between the third AI controlled agent and at least one of the first AI controlled agent or the second AI controlled agent during the simulated browsing session.

17. The system of claim 1, wherein the API is configured to process structured text formats comprising one or more of Hypertext Markup Language (HTML), HTML fragments, Extensible Markup Language (XML), or and JavaScript Object Notation (JSON).

18. A method for use by a system including a cloud browser, an application programming interface (API), a plurality of artificial intelligence (AI) controlled agents and a processor to provide a simulated browsing session, the method comprising:

receiving from a first AI controlled agent of the plurality of AI controlled agents, by the processor, data identifying one or more online actions;

selecting, by the processor based on the one or more online actions, one or both of the cloud browser or the API for executing the one or more online actions;

executing the one or more online actions, by the processor using the one or both of the cloud browser or the API selected for executing the one or more online actions, to generate a result;

communicating to each of the plurality of AI controlled agents, by the processor, the result of executing the one or more online actions; and accepting from a second AI controlled agent of the plurality of AI controlled agents, by the processor, another data identifying a subsequent online action determined autonomously by the second AI controlled agent based on at least one of the result of executing the one or more online actions or a task previously defined by a human user interacting with the first AI controlled agent;

wherein the first AI controlled agent and the second AI controlled agent participate in an independent and at least partially contemporaneous manner to advance the task.

19. The method of claim 18, wherein the subsequent online action is determined autonomously by the second AI controlled agent as a prediction based on the at least one of the result or the task.

20. The method of claim 18, wherein the system supports interaction by the human user with the first AI controlled agent using one or more of an online application or an online device.

21. The method of claim 18, wherein the plurality of AI controlled agents participate to advance the task in at least one of a competitive or collaborative manner.

22. The method of claim 18, wherein a third AI controlled agent of the plurality of AI controlled agents is a non-participant observer or supervisor of the simulated browsing session.

23. The method of claim 22, wherein the third AI controlled agent is configured to evaluate the one or more online actions identified by the data received from the first AI controlled agent.

24. The method of claim 18, wherein accepting the another data identifying the subsequent online action that is determined autonomously by the second AI controlled agent occurs after a condition for advancing the task is satisfied.

25. The method of claim 24, wherein the condition is determined dynamically during the simulated browsing session.

26. The method of claim 24, wherein before the condition is satisfied, the first AI controlled agent has exclusive navigational control over the simulated browsing session.

27. The method of claim 26, wherein the exclusive navigational control over the simulated browsing session is conditioned based on at least one of information or a permission provided by the human user.

28. The method of claim 26, further comprising:

selecting, by the processor based on the subsequent online action, one or both of the cloud browser or the API for executing the subsequent online action;

executing the subsequent online action, by the processor using the one or both of the cloud browser or the API that is selected for executing the subsequent online action, to generate another result; and wherein each of the first AI controlled agent and the second AI controlled agent shares navigational control over the simulated browsing session after the subsequent online action is completed.

29. The method of claim 18, further comprising:

maintaining, by the processor, a record of the simulated browsing session identifying which of the plurality of AI controlled agents determines or executes each online action that is executed during the simulated browsing session.

30. The method of claim 18, wherein the plurality of AI controlled agents includes a third AI controlled agent, and wherein navigational control over the simulated browsing session is one of: (i) shared by the third AI controlled agent with at least one of the first AI controlled agent or the second AI controlled agent, or (ii) passed between the third AI controlled agent and at least one of the first AI controlled agent or the second AI controlled agent during the simulated browsing session.

* * * * *